(12) United States Patent
Kudo et al.

(10) Patent No.: US 7,349,321 B2
(45) Date of Patent: Mar. 25, 2008

(54) INFORMATION REPRODUCTION APPARATUS AND INFORMATION REPRODUCTION METHOD

(75) Inventors: Hiromi Kudo, Kokubunji (JP);
Hiroyuki Minemura, Kokubunji (JP);
Akemi Hirotsune, Saitama (JP);
Harukazu Miyamoto, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 641 days.

(21) Appl. No.: 10/928,261

(22) Filed: Aug. 30, 2004

(65) Prior Publication Data
US 2005/0259551 A1    Nov. 24, 2005

(30) Foreign Application Priority Data
May 19, 2004   (JP)   ................ 2004-148484

(51) Int. Cl.
G11B 7/00   (2006.01)
(52) U.S. Cl. .................. 369/124.03; 369/124.12; 369/59.15
(58) Field of Classification Search .............. None
See application file for complete search history.

(56) References Cited

U.S. PATENT DOCUMENTS

| | | | |
|---|---|---|---|
| 5,835,467 A | | 11/1998 | Tomita et al. |
| 6,333,906 B1 * | | 12/2001 | Yanagisawa et al. .. 369/112.01 |
| 6,442,114 B1 * | | 8/2002 | Ishibashi et al. ........ 369/124.03 |
| 6,970,406 B2 * | | 11/2005 | Kuribayashi et al. .... 369/53.33 |
| 7,050,371 B2 * | | 5/2006 | Miyanabe et al. ....... 369/47.17 |
| 7,218,580 B2 * | | 5/2007 | Nagara et al. ........... 369/44.41 |
| 7,218,581 B2 * | | 5/2007 | Frisson et al. ........... 369/44.32 |
| 2003/0031103 A1 * | | 2/2003 | Kuribayashi et al. .... 369/47.17 |
| 2003/0117914 A1 | | 6/2003 | Kanaoka et al. |

FOREIGN PATENT DOCUMENTS

| | | |
|---|---|---|
| JP | 05-325196 | 12/1993 |
| JP | 07-176052 | 7/1995 |
| JP | 9-320200 | 12/1997 |
| JP | 2000-113595 | 4/2000 |
| JP | 2001-266382 | 9/2001 |
| JP | 2003-196840 | 7/2003 |

* cited by examiner

*Primary Examiner*—Thang V. Tran
(74) *Attorney, Agent, or Firm*—Antonelli, Terry, Stout & Kraus, LLP.

(57) ABSTRACT

Disclosed here is an apparatus and method for realizing write/read of mass information by reducing cross-talk components that are apt to increase in narrow tracks when various disturbances and variations are recognized. In order to achieve the above object, the apparatus is provided with a plurality of equalizers for correcting frequency characteristics of signals reproduced from a plurality of spots, then outputs from those equalizers are subjected to a computing process to correct tap coefficients of the equalizers sequentially so as to minimize the influence of the subject cross-talk, thereby realizing stable reduction of the cross-talk components.

20 Claims, 20 Drawing Sheets

(CONVENTIONAL TECHNOLOGY)

(CONVENTIONAL TECHNOLOGY)

Frequency response of a head

Frequency response of a equalizer

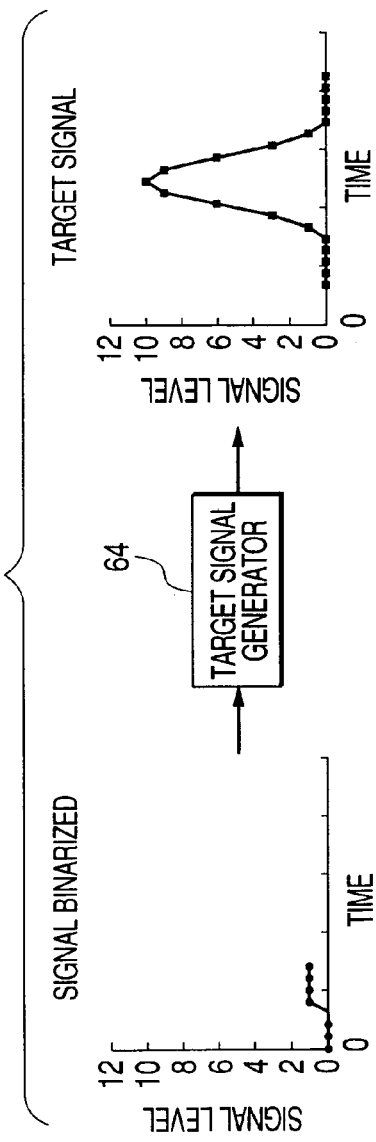

FIG. 10

| Feature | Method-1<br>Conventional | Method-2<br>Compensates Asymmetry | Method-3<br>Compensates non-linear shifts |
|---|---|---|---|
| Configuration PR(1,1) | | | |
| Level No. | 3 | 3 | 3 |
| Pat. Comp. Bits | 0 | 0 | 2(=1+1) |
| No. of V | 0 | $4(=2^2)$ | $16(=2^4)$ |
| Asymmetry | × | ○ | ○ |
| Non-Linear-Shift | × | × | ○ |
| Experimental Result<br>Tw=57nm<br>DTR=100Mbps | $ber=50×10^{-4}$<br>2T S/N RATIO=3.6dB | $ber=15×10^{-4}$<br>2T S/N RATIO=6.1dB | $ber<0.05×10^{-4}$<br>2T S/N RATIO=9.5dB |

| Class Definition | Bit Arrays | State No. | Level No. | Comp. Bits | ML Bits |
|---|---|---|---|---|---|
| PR(1,2,2,1) | 10 | 6 | 7 | 0 | 4 |
| CPR(1,2,2,1)(*) | 10 | 6 | 10 | 4 | 4 |
| CPR(0,1,2,2,1,0)ML4 | 26 | 6 | 26 | 6 | 4 |
| CPR(0,1,2,2,1,0) | 26 | 16 | 26 | 6 | 6 |
| CPR(0,0,1,2,2,1,0,0) | 68 | 42 | 68 | 8 | 8 |
| CPR(0,0,0,1,2,2,1,0,0,0) | 178 | 110 | 178 | 10 | 10 |

(*)CPR:Compensated-PR

800

INFORMATION REPRODUCTION APPARATUS AND INFORMATION REPRODUCTION METHOD

CLAIM OF PRIORITY

The present application claims priority from Japanese application JP 2004-148484 filed on May 19, 2004, the content of which is hereby incorporated by reference into this application.

CO-PENDING APPLICATIONS

U.S. patent applications Ser. Nos. 10/643,975 and 10/774,587 are co-pending applications of the present application. The disclosures of these co-pending applications are incorporated herein by cross-reference.

FIELD OF THE INVENTION

The present invention relates to a method for reproducing information recorded in narrow tracks using a plurality of laser beam spots, thereby realizing reproduction of information at high track density.

BACKGROUND OF THE INVENTION

At first, as an information recording system, an example of a conventional optical recording system will be described with reference to FIG. 2. FIG. 2 is a block diagram of a conventional optical write/read apparatus. A beam emitted from a laser beam source 25 (wavelength: about 660 nm for the DVD-RAM), which is part of a head 2, is passed through a collimating lens 24 to obtain an almost collimated laser beam 22. The laser beam 22 is then applied on an object optical disk 11 through an objective lens 23 to form a beam spot 21 thereon. After that, the laser beam 22 is passed through a beam splitter 28 and a hologram element 29, etc. to be led to a servo detector 26 and a signal detector 27 respectively. The signals output from those detectors are subjected to an addition/subtraction process to generate servo signals such as tracking error signals, focus error signals, etc. that are inputted to a servo circuit. The servo circuit controls the positions of driving means 31 of the objective lens 23 and the optical head 2 entirely according to the obtained tracking and focus error signals, thereby positioning the laser beam 21 in the target write/read region. The signals added up in the detector 27 are inputted to a signal reproduction block 41. The inputted signals are sent to a signal processing circuit in which those signals are subjected to processes of filtering, equalization in frequency domain, and digitizing. The digitized signals obtained in the signal processing circuit are then processed in an address detection circuit and a decoding circuit respectively. And, according to each address signal detected in the address detection circuit, a microprocessor computes the position of the laser beam spot 21 on the optical disk 11 and controls an automatic position controlling means to position both of the optical head 2 and the laser beam spot 21 in the target recording unit region (sector).

If recording is instructed from a host computer to the optical write/read apparatus at that time, the microprocessor receives data from the host computer, then stores the recording data in its memory and controls the automatic position controlling means to position the laser beam spot 21 in the target recording region. Then, confirming that the laser beam spot 21 is positioned in the target region correctly according to an address signal received from the signal reproducing block 41, the microprocessor controls the laser driver, etc. to record the data read from the memory in the target recording region (sector).

As an example of such reproduction of information recorded at high track density, there is a system that uses three beams to cancel a cross-talk as shown in FIG. 3. Unlike the above conventional optical recording system, this system divides a laser beam almost collimated by the collimating lens 24 into three laser beams with use of a diffraction grating 30 and each of the divided laser beams is focused on the optical disk 11 through an objective lens 23. Those three laser beams come to form beam spots 43 in three tracks at an equal distance from each another on a diagonal line of each track so as to avoid mutual interference between the adjacent spots; one beam spot 43 is formed in one of the three adjacent tracks.

Such systems that use three laser beams respectively are disclosed in the official gazettes of JP-A No. 320200/09, JP-A No. 266382/2001, JP-A No. 176052/07, etc. In addition to those systems that use three laser beams respectively, there are some methods proposed for similar objects. One of the methods is to provide a cross-talk detection (study) region on the object recording medium and tracing the region with three laser beams, thereby obtaining desired information (the official gazette of JP-A No. 196840/2003, for example) and another of the methods is to form an algorithm using a relationship between a main track and its two side tracks to obtain desired information (official gazette of JP-A No. 113595/2000, for example), and still another method is to remove leak signals with use of various types of algorithms of a signal processing system (official gazette of JP-A No. 325196/05).

[Patent document 1] JP-A No. 320200/09
[Patent document 2] JP-A No. 266382/2001
[Patent document 3] JP-A No. 176052/07
[Patent document 4] JP-A No. 196840/2003
[Patent document 5] JP-A No. 113595/2000
[Patent document 6] JP-A No. 325196/05

SUMMARY OF THE INVENTION

In the above conventional examples, in order to reduce an object cross-talk, it is required to change the frequency characteristic of each sub-beam. However, none of the conventional examples discloses any method for determining tap coefficients of the equalizers. In addition, each of the conventional examples includes a problem that the effect of the cross-talk cancellation might be lowered upon such disturbance as disk tilt, track offset occurrence, and variation in the shape of the medium track. And, because timing adjustment is done according to the edge position of recorded information in the reproduced signal processing provided in each of the above conventional methods, the method does not function if the linear density of recorded information increases up to a level that laser spot can't resolve.

Under such circumstances, it is an object of the present invention to provide a method and apparatus for enabling cross-talk cancellation by reducing the cross-talk components in narrow tracks stably regardless of any of disturbances and variations.

The information reproduction apparatus of the present invention comprises means for forming a plurality of beam spots including a main spot on an information recording medium; a plurality of detectors for detecting reflected beams from the plurality of laser beam spots; a plurality of equalizers for adjusting at least frequency characteristics of output signals from the plurality of detectors; an arithmetic block for computing output signals from the plurality of detectors or equalizers; a decoding block for decoding information recorded on the information recording medium according to output signals from the arithmetic block; a target signal generator for generating a target signal from an output from the decoding block; a corrected value generator for comparing an output level of the target signal generator with an output value of the arithmetic block to compute a corrected value of a tap coefficient of each of the plurality of equalizers, and input means for inputting the computed corrected value to each of the plurality of equalizers.

Consequently, the tap coefficients of the plurality of equalizers come to be controlled so as to approach a target value of a reproduced signal to a computed result, so that the cross-talk components included in a reproduced signal can be minimized effectively. The plurality of tap coefficients of the plurality of equalizers are corrected so as to minimize the influence of the cross-talk components from side tracks.

If transversal type filters or FIR type filters having a plurality of coefficients and taps respectively are used as the equalizers, the equalizing characteristic can be changed in accordance with the characteristic of each laser beam spot easily and flexibly. The decoding process of the decoding block should preferably cope with at least the PRML decoding so that the signal reproduction error rate is lowered and the cross-talk amount is minimized, thereby the target signals are generated stably and the reproduction stability is improved.

According to the present invention, cross-talk components can be removed surely even in narrow tracks and at high linear density, that is, at high recording density. Particularly, the present invention can cancel cross-talk components surely even when aberration occurs with disk tilt etc, thereby the cross-talk can be cancelled regardless of the size and defocus of each sub-beam with respect to the main beam.

BRIEF DESCRIPTION OF THE DRAWINGS

FIG. 9 is a schematic configuration of a target signal generator and a relationship between the signal level (binary signal/target signal) and the time;

FIG. 10 illustrates the basic concept of an information reproduction method that employs a compensated-type-PRML method;

DETAILED DESCRIPTION OF THE PREFERRED EMBODIMENTS

Hereunder, the preferred embodiments of the present invention will be described with reference to the accompanying drawings. In those drawings, the same numerals/symbols will be used for the same functional parts to avoid redundant description.

Figure 4:
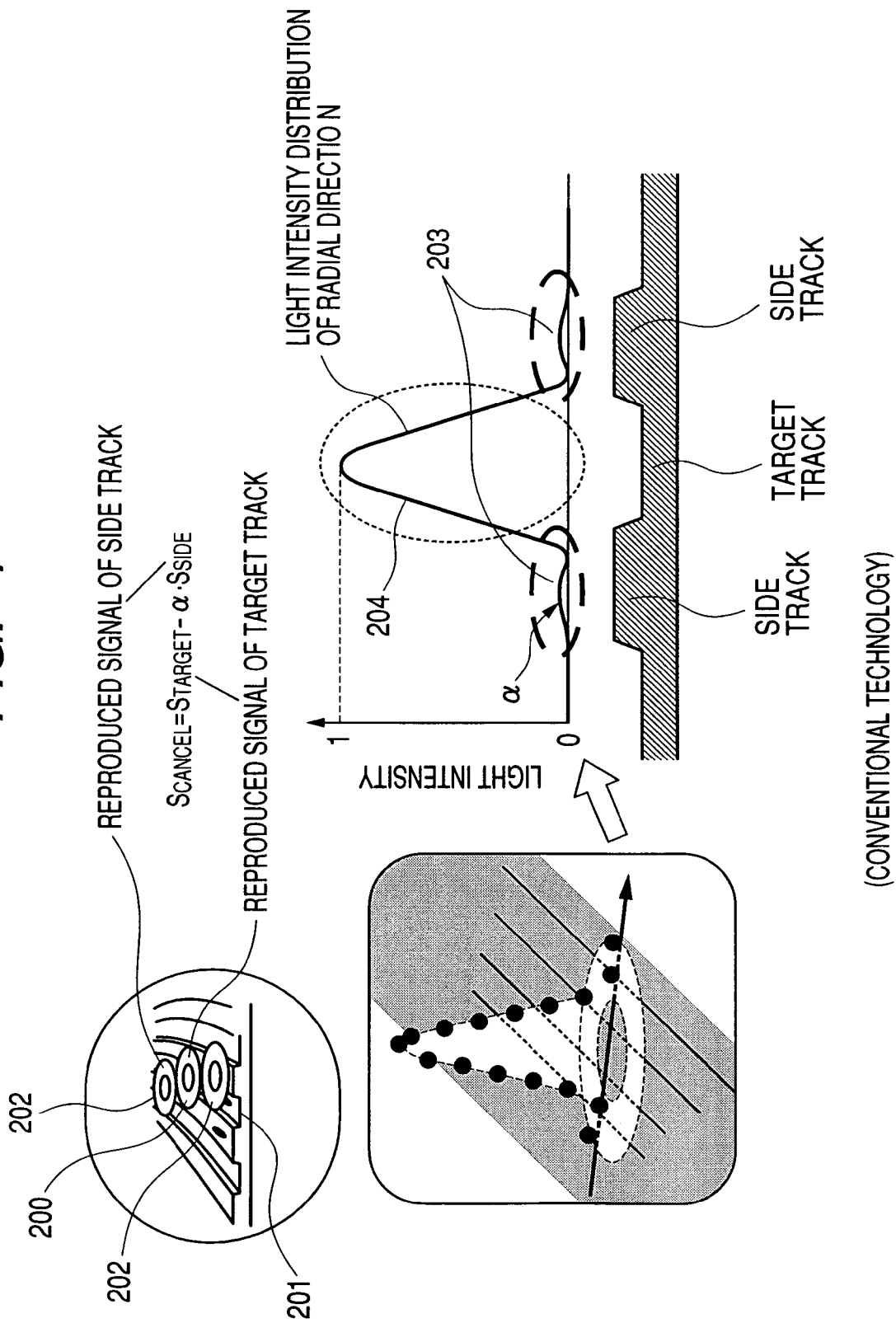
FIG. 4 is a concept chart of the conventional method.

At first, a description will be made for the conventional three-beam cross-talk cancellation method. FIG. 4 shows the concept of the conventional method. The three-beam cross-talk cancellation method disclosed in each of the official gazettes of JP-A No.320200/09, No.266382/2001, and No.176052/07 reads recorded information from a target track 201 at a center spot 200 and reads recorded information from side tracks, which are assumed to be cross-talk components, at spots 202 disposed at both sides of a target track 201a, thereby multiplying the reproduced signals from the side tracks by a proper coefficient α respectively, subtracting the results from the reproduced signal of the target track to cancel the cross-talk components.

Next, a description will be made for the meaning of the coefficient α with reference to FIG. 4. The information recorded in a target track is read by a main lobe 204. And, a cross-talk occurs when signals are read from side tracks by side lobes 203 that cross the laser beam spots in the radial direction. In other words, the cross-talk component included in the reproduced signal of the target track is considered to be proportional to the light intensity of the side lobe 203. This is why the coefficient α is considered to be affected by the light intensity of the side lobe.

Figure 5:
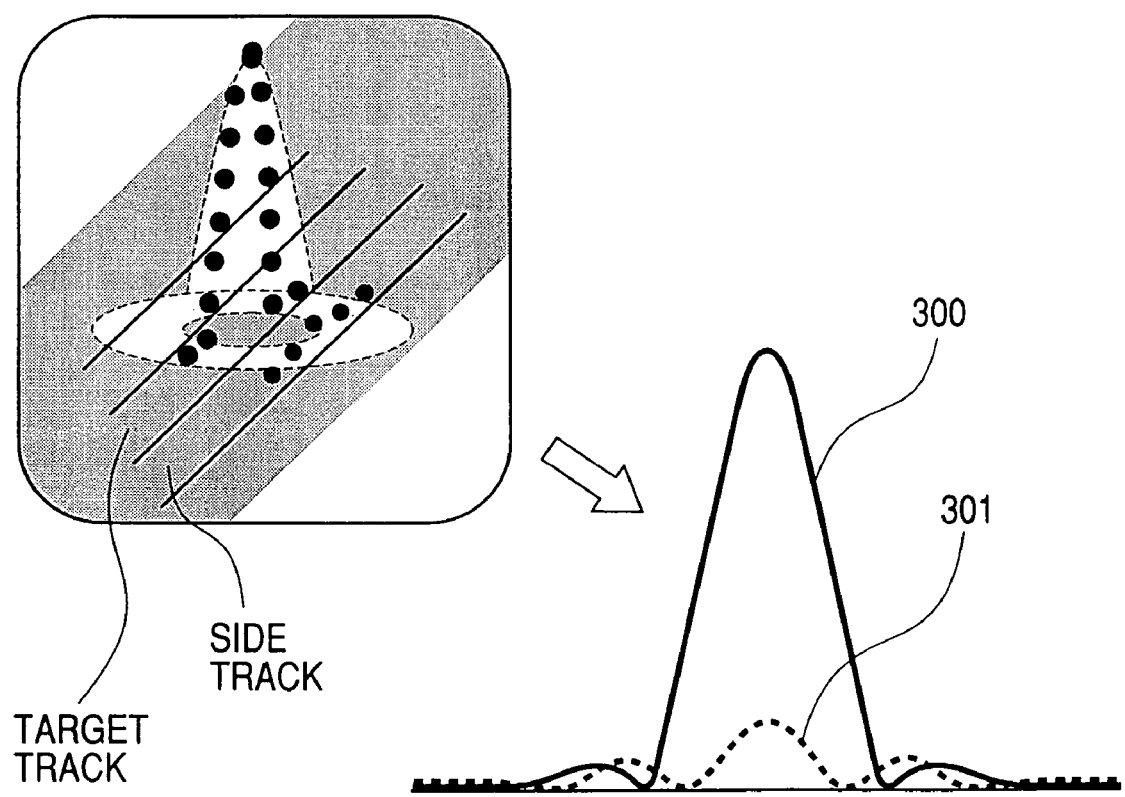
FIG. 5 is a chart for describing the distribution of laser light intensity in the tangential direction.

Although the conventional method focuses on the light intensity distribution in the radial direction as described above, the present invention focuses on the light intensity distribution in the tangential direction. FIG. 5 shows the light intensity distribution in the tangential direction. The light intensity distribution 300 of the target track is denoted by a solid line while the light intensity distribution 301 in each of the side tracks is denoted by a dotted line. The cross-talk cancellation of the present invention uses three beams to cancel cross-talk components, so that the recording mark of each of the three tracks is read by each of the three spots. Here, a description will be made by focusing on the target track and one of the side tracks.

Figure 6:
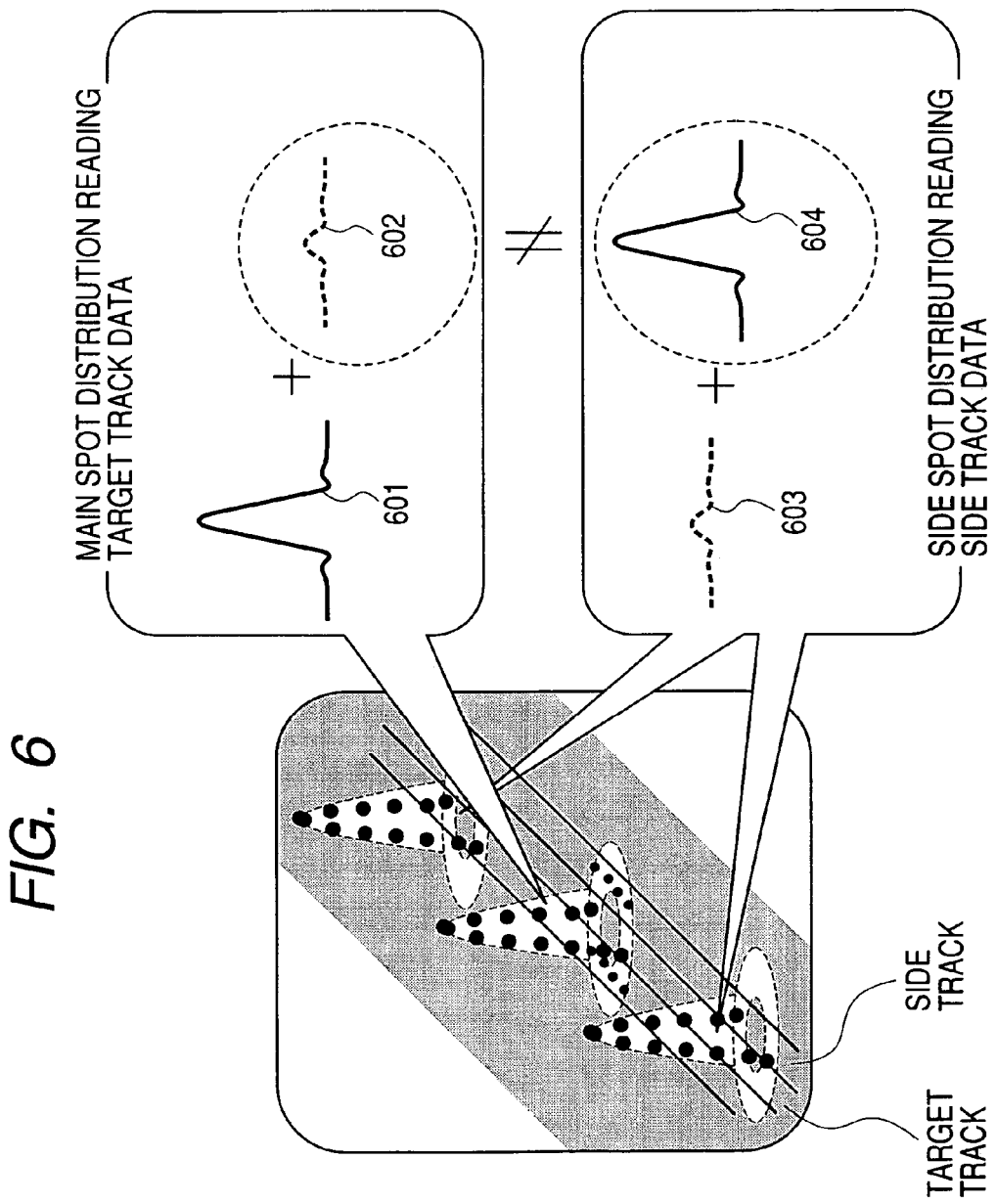
FIG. 6 illustrates a difference of the distribution of light intensity between the main beam spot and its side spot.

FIG. 6 shows a difference of the light intensity distribution between the main spot and the side spot in adjacent track. As shown in FIG. 6, recorded information to be read by the main spot consists of information recorded in the target track to be read according to the light intensity distribution denoted by a solid line 601 and information recorded in the side track which is cross-talk components that must be removed to be read according to the light intensity distribution denoted by a dotted line 602 respectively. Recorded information to be read by a side spot to cancel the cross-talk consists of recorded information in side track to be read according to the light intensity distribution denoted by a solid line 604 and recorded information in the target track to be read according to the light intensity distribution denoted by a dotted line 603. The distribution denoted by the dotted line 602 of the main spot and the distribution denoted by the solid line 604 of the side spot read information recorded in side track, that is, information of cross-talk components. However, because each of the light intensity distribution differs, information obtained as reproduced signal is different.

In other words, if the distribution denoted by the solid line 604 of the side spot can be converted to the distribution denoted by the dotted line 602 of the main spot, the cross-talk cancellation is expected to be made surely. However, because a light intensity distribution is determined by the diffraction effect of the object beam, conversion of such a light intensity distribution is impossible. This is why the inventor et al of the present invention have developed a method for correcting the space distribution denoted by the solid line 604 of a side spot to the space distribution denoted by the dotted line 602 of the main spot.

According to the method, because an optical space distribution can be obtained as a time response with respect to a reproduced signal of a recording mark, the difference between time responses of reproduced signal of both of the main spot and each side spot is corrected instead of converting the light distribution itself. The present invention realizes such correction of the time response, that is, conversion of the time response using a plurality of equalizers.

Figure 7:
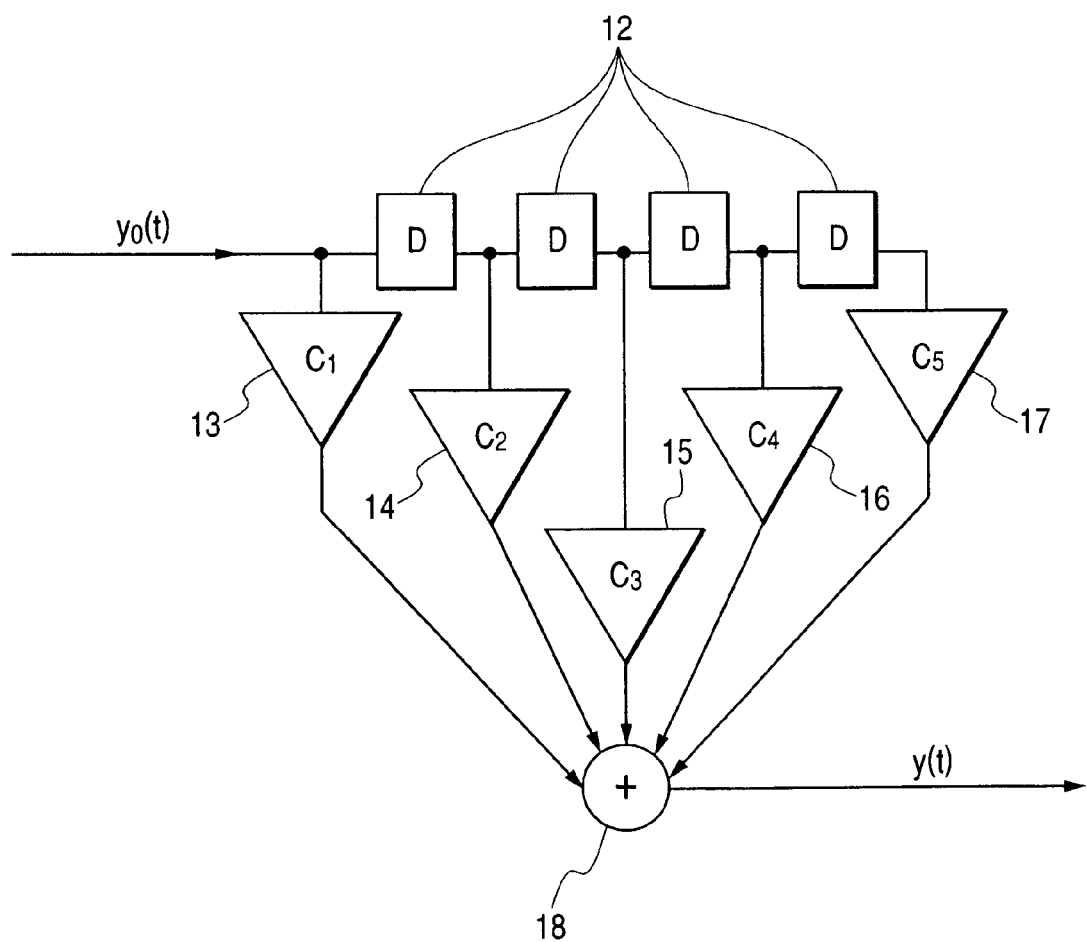
FIG. 7 illustrates how equalizers are disposed.

FIG. 7 shows a schematic block diagram of an equalizer of the present invention. The equalizer is composed of a delay circuit 12, tap coefficient circuits 13 to 17, and an addition circuit 18. The equalizer is a product sum arithmetic circuit (transversal type filter or FIR type filter) that satisfies the following expression.

$$y[t] = \sum_{n=-N/2}^{N/2} C_n \times y_0[t-n] \quad (1)$$

Here, the $y[t]$ denotes an equalizer output signal, the $y_o[t]$ denotes an equalizer input signal, the $C_n$ denotes an n-th tap coefficient, and the t denotes a time. The sampling interval is set at 15.2 ns here.

Figure 8A:
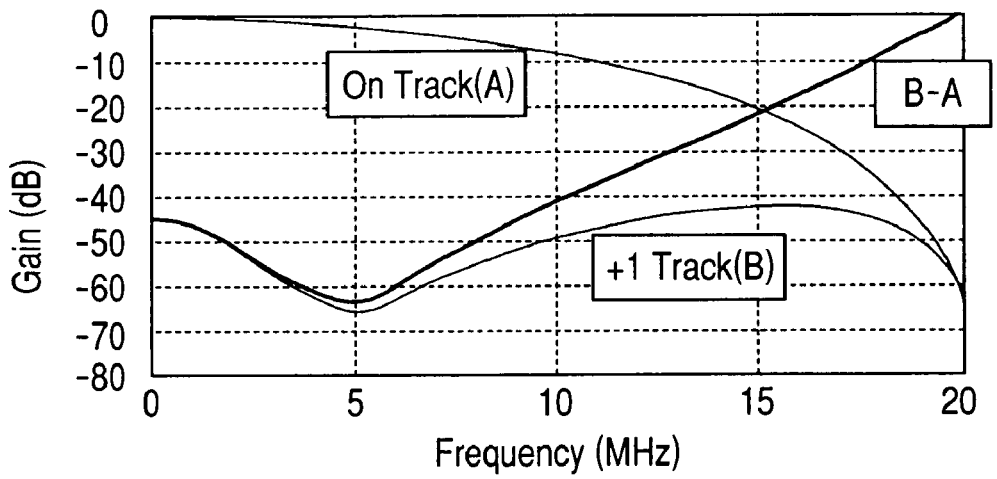
FIG. 8 illustrates the frequency characteristic of the reproduced signals from a track.

Next, a description will be made for a concrete example of tap coefficient of the equalizer to make it easier to understand the present invention. FIG. 8A shows a computing result of the frequency characteristic of signals reproduced by an optical head from a target track and its side tracks. The optical head parameters are set as follows; the wavelength is 405 nm, the numerical aperture is 0.85, and the track pitch is 0.24 μm. The track is structured with lands and grooves having a groove depth that is 1/6 of the wavelength. The well-known scalar diffraction calculation method is used to obtain reproduced signals, which are then subjected to a Fourier transformation process to obtain the frequency characteristic. As shown in FIG. 8A, if the target track characteristic is defined as A and the side track characteristic is defined as B, (B−A) becomes a target of correction for the main spot to light intensity distribution in the tangential direction. The side track gain is minimized at about 5 MHz due to the influence of the side lobe denoted in FIG. 4. If a beam spot has no side lobe, the frequency characteristic of the side track becomes flat and the cross-talk components are canceled satisfactorily only by a certain coefficient α. However, because the shape of a beam spot is determined by a diffraction phenomenon and a side lobe is generated under the influence of the objective lens aperture, the frequency characteristic of (B−A) must be translated by taking the side lobe influence into consideration to realize highly accurate cross-talk cancellation.

Figure 8B:
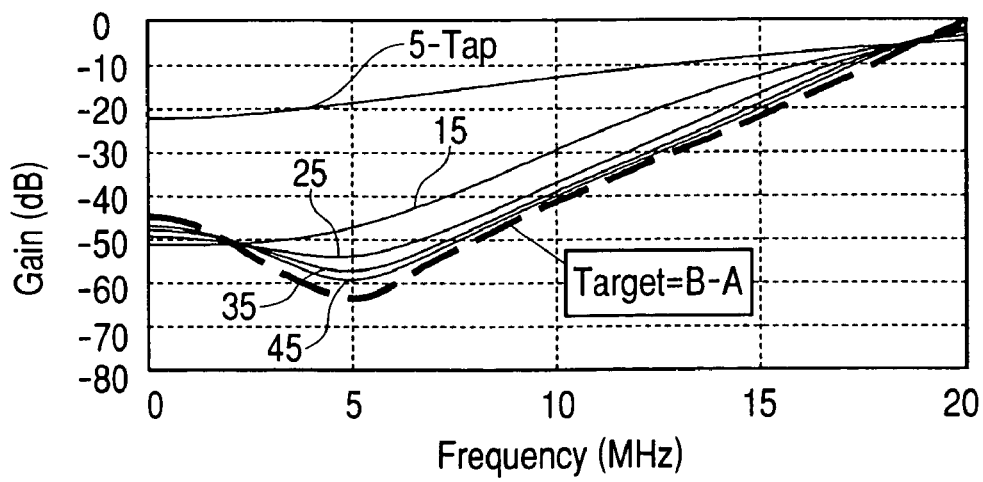

FIG. 8B shows a frequency characteristic to appear each time the number of taps of the object equalizer is changed to 5, 15, 25, 35, and 45. The tap coefficient of an equalizer is calculated as follows using the DFT (Discrete Fourier Transform) when a target frequency characteristic is given. Note that, however, the calculation is made only for the real part here.

$$C_n = \frac{1}{M} \sum_{k=0}^{M-1} T[k]\cos(2\pi nk/M) \quad (2)$$

Here, the $C_n$ denotes a coefficient of a tap number n to be obtained. The $T[k]$ denotes the target frequency characteristic, the M denotes the dividing number of a sampling frequency (=clock frequency, 66 MHz here). Here, M=1024 is set so as to obtain necessary and sufficient accuracy. As shown in the figure, as the number of taps increases, the equalizer frequency characteristic goes closer to the target value. On the other hand, as the number of taps increases, the circuit scale and the power consumption come to increase. The number of taps must thus satisfy both necessary and efficient values.

Table 1 shows a concrete collection of tap coefficients under each condition (the number of taps).

TABLE 1

Tap Coefficients

| Tap | 5-Tap | 15-Tap | 25-Tap | 35-Tap | 45-Tap |
|---|---|---|---|---|---|
| 0 | 0.456562 | 0.456562 | 0.456562 | 0.456562 | 0.456562 |
| ±1 | −0.19475 | −0.29012 | −0.30181 | −0.30529 | −0.30677 |
| ±2 | 0.005647 | 0.0336 | 0.039447 | 0.041313 | 0.042124 |
| ±3 | | 0.045738 | 0.066278 | 0.073625 | 0.076939 |
| ±4 | | −0.01335 | −0.02652 | −0.03207 | −0.0347 |
| ±5 | | −0.00501 | −0.01564 | −0.02118 | −0.02399 |
| ±6 | | 0.002161 | 0.013094 | 0.02049 | 0.024582 |
| ±7 | | 0.000085 | 0.001629 | 0.00306 | 0.003937 |
| ±8 | | | −0.00412 | −0.00973 | −0.01361 |
| ±9 | | | 0.000644 | 0.002036 | 0.003146 |
| ±10 | | | 0.000716 | 0.003335 | 0.005796 |
| ±11 | | | −0.00023 | −0.00186 | −0.00372 |
| ±12 | | | −2.4E−05 | −0.00057 | −0.00135 |
| ±13 | | | | 0.000805 | 0.002327 |
| ±14 | | | | −6.9E−05 | −0.00026 |
| ±15 | | | | −0.00017 | −0.00092 |
| ±16 | | | | 0.000051 | 0.000463 |
| ±17 | | | | 0.000007 | 0.000198 |
| ±18 | | | | | −0.00023 |
| ±19 | | | | | 0.000015 |

TABLE 1-continued

| | | Tap Coefficients | | | |
|---|---|---|---|---|---|
| Tap | 5-Tap | 15-Tap | 25-Tap | 35-Tap | 45-Tap |
| ±20 | | | | | 0.000057 |
| ±21 | | | | | −1.6E−05 |
| ±22 | | | | | −2E−06 |

In an actual optical disk drive, the shape of beam spot might differ from its calculated one due to such factors as optical head aberration, wavelength, disk tilt, defocus, etc. In addition, the same recording conditions cannot often be obtained between the target track and each of its side tracks due to the changes of the disk drives, recording powers, etc. And, to cope with such variable elements and keep obtaining the cross-talk cancellation effect satisfactorily, the tap coefficients of the equalizers must be studied to update them properly as needed. The widely known LSE (Least Square Error) method is such a studying method. It is preferred to be employed for disk drives.

DETAILED DESCRIPTION OF THE PREFERRED EMBODIMENTS

Hereunder, a preferred embodiment of the present invention, which uses equalizers, will be described.

First Embodiment

Figure 1:
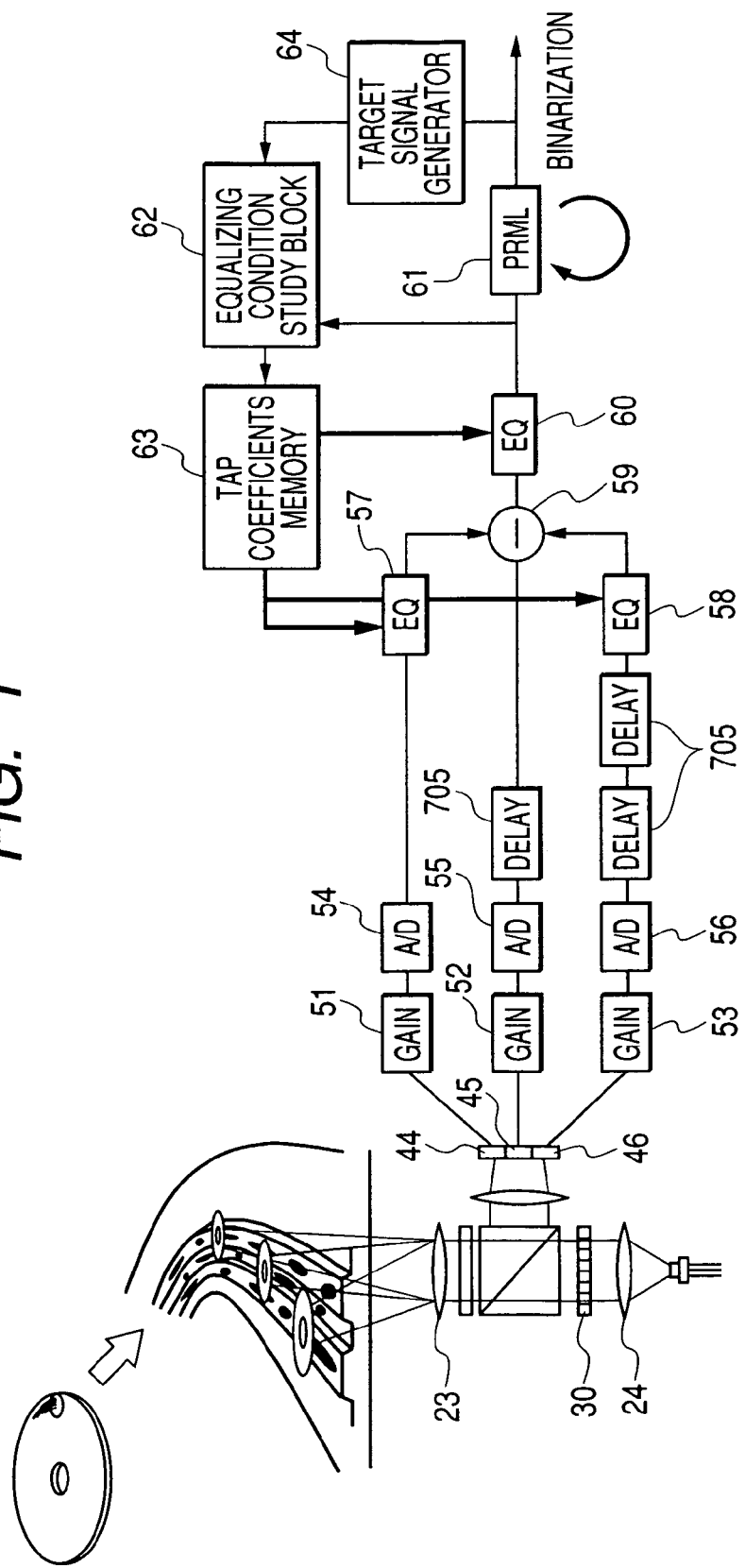
FIG. 1 is a block diagram of an information reproduction apparatus of the present invention.
Figure 2:
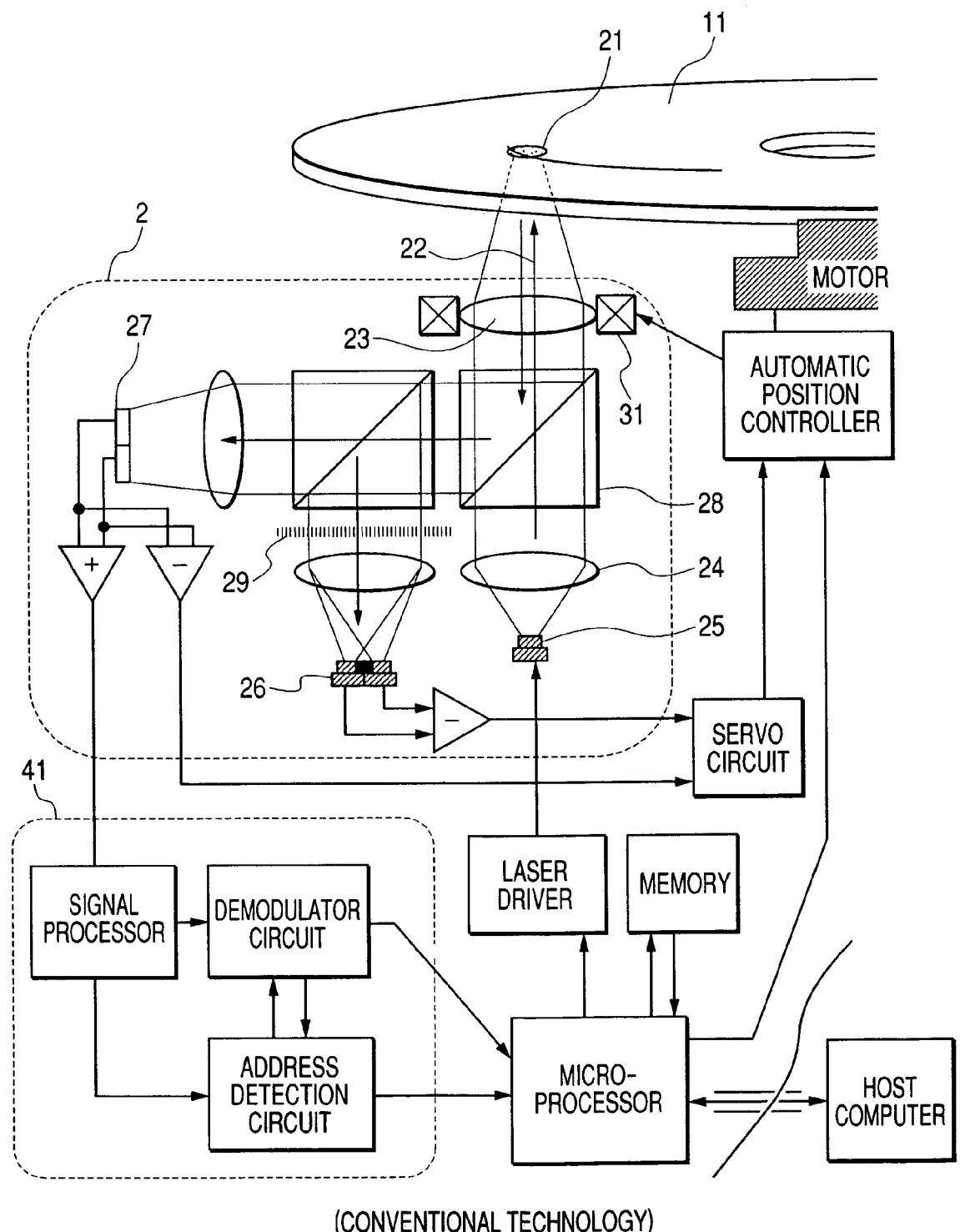
FIG. 2 is a block diagram of a conventional optical write/read apparatus.
Figure 3:
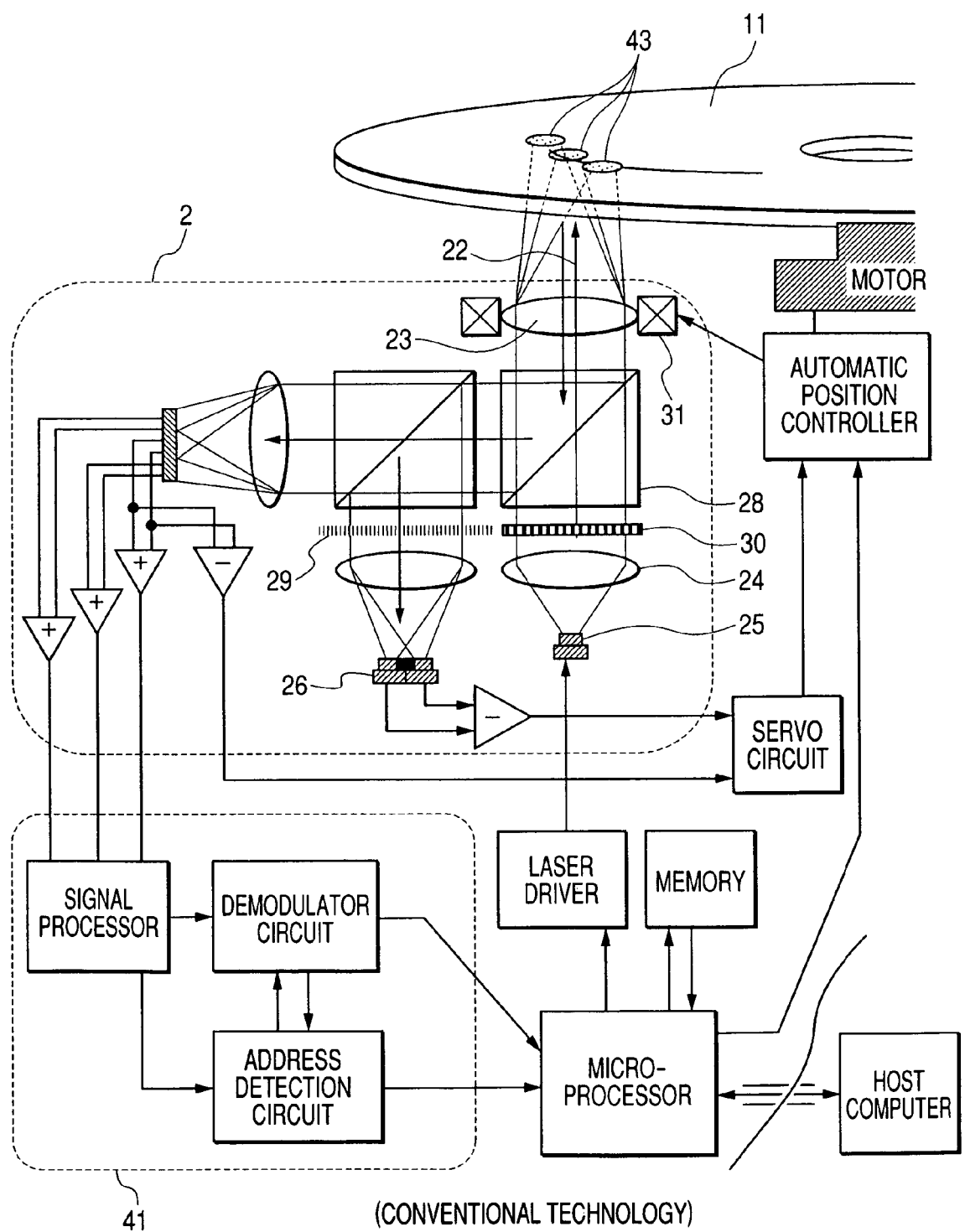
FIG. 3 is another block diagram of the conventional optical write/read apparatus.

FIG. 1 shows a block diagram of an information recording apparatus in an embodiment of the present invention for realizing cross-talk cancellation at high track density.

A laser beam emitted from a laser beam source is passed through a collimating lens 24 to obtain a collimated beam, which is then divided into three spots by a diffraction grating 30. The divided three beam spots are positioned in three tracks (front, center, and rear) at almost an equal distance (7 μm) from each another by the diffraction grating so that they are protected from mutual interference. The center spot is assumed as the main spot and two spots at both sides of the center spot are assumed as side spots. The laser beam is focused so that the center spot is formed in the target track.

In the verification of the present invention, the laser beam is set at a wavelength of 405 nm and at a numerical aperture of 0.85. Consequently, the beam spot diameter becomes 410 nm that is calculated from $(\lambda/NA) \times 0.87$.

The divided three beams are focused on the object information recording medium through the objective lens 23. And, a polarizing beam splitter and a λ/4 plate are used to inject the reflected beams from the medium into the photo detectors 44 to 46 by 100% without returning them to the laser beam source. As reproduced signals of each of the beam spot are output of the photo detector 44 to 46. Gain adjusting means 51 to 53 are used to adjust the gain of each of the reproduced signals from each of the tracks so as to adjust it to the dynamic range of each of the AD converters 54 to 56. After that, the AD converters 54 to 56 convert reproduced signals of each of the track to digital values.

Cross-talk cancellation must be done for the information recorded in adjacent three tracks at the same time by subtracting the cross-talk components in both of the side tracks from the reproduced signal from the target track. Therefore, the timings of the beam spots positioned in those three tracks (front, center, and rear) at a certain distance from each another must be adjusted so as to be aligned. This is why the delay circuit 705 is used to adjust those timings.

Among the timing-adjusted reproduced signals, the reproduced signals from both of the side tracks are passed through the equalizers (EQ) 57 and 58 that correct the optical space distribution described above to time responses. The reproduced signals from the side tracks, corrected by the equalizers 57 and 58, are subtracted from the reproduced signal from the target track in the subtractor 59.

The signal that is a result of the above subtraction is passed through an equalizer (EQ) 60 to optimize the signal frequency characteristic. This is to binarize the signal appropriately in a PRML (Partial Response Maximum Likelihood) decoder 61 that determines a target level in proportion to an asymmetrical amount of the signal corresponding to a non-linear shift of a recording mark in accordance with a bit pattern for the high linear density. The output of the equalizer 60 is inputted to the PRML decoder 61.

Binarized signals output from the PRML decoder 61 are passed through the target signal generator 64 to obtain target signals. Each target signal is subjected to equalization due to the PRML decoder's instructing coefficient circuit of equalizer as shown in FIG. 7 to make a convolution processing for the PR value 1, 2, 3, 3, 2, 1 shown in FIG. 9A, which is assumed as a value of the coefficient circuit. As shown in FIG. 9B, the binarized signal is converted to a target signal by the target signal generator 64. A proper PRML class may be selected according to the object recording linear density. If a Blu-ray disk, a blue-violet light source is used and the linear density is 23-27 GB or so, is assumed as a reference one, the PR class may be any of PR(1, 2, 1), PR(1, 2, 2, 1), PR(1, 1, 1, 1), and PR(2, 3, 3, 2). If the shortest recording mark is shorter than the optical cut-off frequency ($\lambda$/NA/4) of the optical head, the PR class should be one of PR(1, 2, 2, 2, 1) and PR(1, 2, 3, 3, 2, 1) that is found to be appropriate in the examination. And, in order to compensate asymmetry of reproduced signals and the non-linear shift to be caused by thermal interference when in recording to improve the reproduction performance, a decoding method that enables the target level to be changed in accordance with the reproduced signal may be used. The decoding method is disclosed in "Proc. ISOM2003. Tec. Dig. p 34-35" and referred to as a compensated-type- or adaptive-type-PRML. In the following description, which explains the test results with the compensated-type-PRML. In the compensated-type-PRML, the PR(1, 2, 3, 3, 2, 1) is assumed as the basic class. In the present invention, it is very important to select a proper PRML method. When the linear density is low, the PR(1, 2, 1) may be used, for example.

Next, a description will be made for an example of the compensated-type-PRML. According to the examination by the present inventor et al, it is found that improvement of the performance is limited even when the configuration is more complicated by increasing the number of PR class bits simply. This is because a non-linear edge shift occurs in signals reproduced from the object optical disk. And, the non-linear edge shift is caused by inter-symbol interference caused by the shape of the laser beam spot and by thermal interference when in recording. To cope with such non-linear inter-symbol interference and edge shift, the basic PRML method that determines a target value through linear convolution is not so effective. Such non-linear components should be compensated by all means, however. The following two points are thus indispensable to realize higher density tracks.

(1) The number of class bits is suppressed to suppress the number of target levels from increasing.

(2) A compensation amount is added to a target value determined by convolution in accordance with the bit string to compensate the target value, thereby coping with the non-linear components included in reproduced signals.

In order to satisfy those requirements and realize a large capacity for the above information reproduction apparatus, the PRML method may be used. The PRML method adds a compensation amount in accordance with the content of the object N-bit (N>NN) string to determine the target value to a target value determined by NN-bit convolution, then compare the result with a reproduced signal, binarize to the most likelihood bit string selected from N-bit strings, that is, a bit string that can minimize the difference between the object reproduced signal and the target value.

FIG. 10 shows an embodiment that denotes the basic concept of the above information reproduction method of the present invention. In order to simplify the description, the most basic class PR(1, 1) is employed in this embodiment. The method 1 is the basic PRML method. As shown in the configuration example, a comparison is made between the target value corresponding to each of the bit strings assumed at consecutive two times and the reproduced signal value to select a bit string having the least difference. In this example, there are three target levels, so that it is impossible to cope with both of the reproduced signal asymmetry and the non-linear inter-symbol interference.

The method 2 is an adaptive PRML method disclosed in "Technical Digest of ISOM 2002, 269-271 (2002)". A compensation value V corresponding to a 2-bit string is added to the target value to be determined by convolution to obtain a new target value, then a bit string that minimizes the difference from the object reproduced signal value is selected to binarize signals. The number of compensation values V is $4(=2^2)$. In that case, while the target value is changed in accordance with the reproduced signal asymmetry, the non-linear inter-symbol interference cannot be removed sufficiently.

The method 3 will be referred to as a compensated-type-PRML obtained by adding a pattern compensation bit to both front and rear of the PR(1, 1) bit string respectively. Unlike the method 2, this method 3 is characterized in that a compensation value V is added to the target value. The value V corresponds to a 4-bit string to which pattern compensation bits are added. Then, a comparison is made between the target value corresponding to a 4-bit string and a reproduced signal while a bit string having the least difference is selected to binarize signals. In this method, the number of target levels determined by convolution is kept at 3 and the number of compensation values V is set at $16(=2^4)$. Therefore, non-linear inter-symbol interference can be compensated within a range of a 4-bit string. And, in order to distinguish between the conventional PRML method and this PRML method, the PR class is represented as compensated-PR(0, 1, 1, 0) or CPR(0, 1, 1, 0). This PRML method includes 4 class bits. Each target value is calculated by convolution between a coefficient string (0, 1, 1, 0) and a 4-bit string just like the conventional method. However, because each of the bits at both ends has a coefficient 0, the target value becomes the same as the target value determined in the 2-bit coefficient string (1, 1). Each of the front and rear coefficients "0" represents a pattern compensation bit and the CPR comes to mean addition of a compensation value V determined by a 4-bit string to the target value. The conventional method 1 can be represented by the same method as PR(1, 1) and the method 2 can be described as CPR(1, 1).

The test results shown in FIG. 10 are obtained by recording information on the above described optical disk at a detection window width Tw of 57 nm (recording capacity=32.5 GB) with use of each of the methods described above. In that case, PR(1, 2, 2, 1) is assumed as the basic PR class and the data transfer rate is 100 Mbps. The bit error rate is $50\times10^{-4}$ for the method 1, $15\times10^{-4}$ for the method 2 (CPR(1, 2, 2, 1)), and $0.05\times10^{-4}$ for the method 3 (CPR(0, 1, 2, 2, 1, 0)). It is assured that the method 3 can lower the bit error rate to 1/100 and under. The reproduced signal eye pattern denotes an effective signal (compensated reproduced signal) in each of the above methods. The method 3 enables the eye pattern to be opened clearly. The S/N ratio of the 2Tw signal included in the compensated reproduced signal is 3.6 dB for the method 1, 6.1 dB for the method 2, and 9.5 dB for this method.

Figures 11A, 11B:
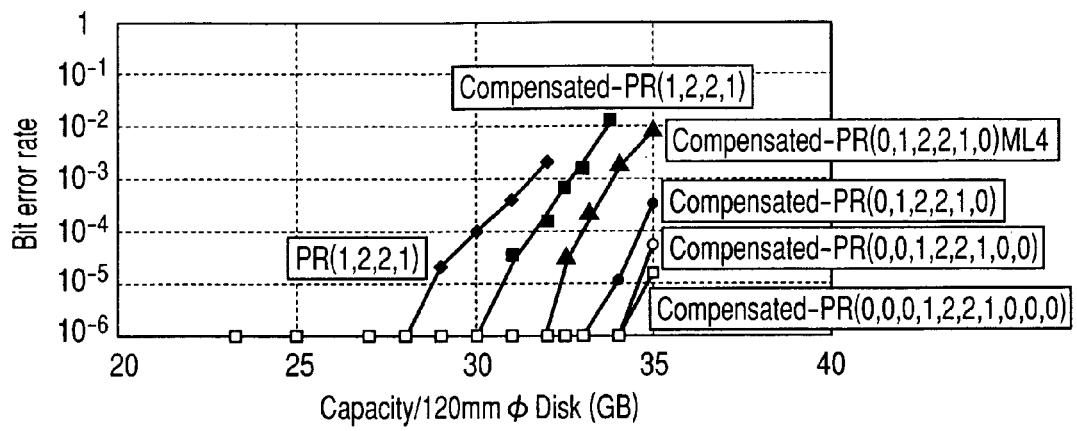
FIG. 11 illustrates a test result of large capacity performance between the compensated-type-PRML method and another PRML method.

FIG. 11A shows a test result denoting a difference of performance between the compensated-type-PRML method and another PRML method. PR(1, 2, 2, 1) is selected as the basic PR class. If the bit error rate allowable value is determined as $10^{-4}$, the upper limit of the recording capacity is required. The upper limit of the recording capacity of the conventional method is 30 GB for PR(1, 2, 2, 1) and 32 GB for CPR(1, 2, 2, 1). The upper limit of the recording capacity of the compensated-type-PRML method is 32.5 GB for CPR(0, 1, 2, 2, 1, 0) ML4, 34.5 GB for CPR(0, 1, 2, 2, 1, 0), and 35 GB and over for CPR(0, 0, 1, 2, 2, 1, 0, 0) and CPR(0, 0, 0, 1, 2, 2, 1, 0, 0, 0). CPR(0, 1, 2, 2, 1, 0)ML4 denotes a method that keeps 4 bits as the number of bits (the number of ML bits) for executing maximum likelihood decoding for selecting the most likelihood bit string by determining only the compensated value with 6 bits. This method is better than the conventional technique. However, because the maximum likelihood decoding is performed without including a pattern compensation bit, the non-linear shift cannot be suppressed so effectively. In order to obtain the highest performance of the compensated-type-PRML method, the pattern compensation bit must be included in the object maximum likelihood decoding. The result obtained here enables the recording capacity to increase more than any of the various PR classes described above even while the PR(1, 2, 2, 1) is not the basic PR class.

FIG. 11B shows a relationship among the number of bit strings, the number of states, the number of levels, the number of pattern compensation bits, and the number of ML bits with respect to each of the methods shown in FIG. 11A. The scale of the circuit for realizing the PRML method is determined almost in proportion to the number of bit strings. Therefore, in order to realize the CPR(0, 0, 0, 1, 2, 2, 1, 0, 0, 0) in which 3 pattern compensation bits are added to the front and rear portions thereof respectively, the circuit must be expanded by more than 10 times that of the PR(1, 2, 2, 1), so that the performance and circuit scale are required to be balanced.

In this example, PR(1, 2, 2, 1) is selected as the basic PR class and the same number of pattern compensation bits are added to both front and rear of the PR class. However, that is not only the compensated-type-PRML. Any of PR(1, 2, 1), PR(3, 4, 4, 3), PR(1, 1, 1, 1), PR(1, 2, 2, 2, 1), etc. may be selected as the basic PR class. In addition, the number of pattern compensation bits to be added to both front and rear of the object PR pattern respectively may not be symmetrical; the number of bits may be asymmetrical like CPR(0, 1, 2, 2, 1), CPR(0, 0, 1, 2, 2, 1), CPR(1, 2, 2, 1, 0), CPR(1, 2, 2, 1, 0, 0), etc. For example, if it is physically apparent that recording time thermal interference is concentrated at only the front edge of a signal and the signal is to be reproduced, the best way for the signal reproduction is to add such pattern compensation bits only to the front side of the PR pattern in some cases. This completes the description of the compensated-type-PRML.

Return to FIG. 1. In the equalizing condition study block 62, the difference between a signal passed through the equalizer 60 for optimizing the frequency characteristic to binarize signals effectively in the PRML decoder 61 and the target signal obtained from the target signal generator 64 is used for the block 62 to study each equalizer tap coefficient sequentially during a certain period so as to minimize the difference. In this example, the block 62 is instructed to study such tap coefficients of equalizers sequentially for a period of 16 kB. The equalizing condition study block 62, which generates a corrected value according to the difference from the target signal, uses the LSE method as such a corrected value generation method. The LSE method is widely known as an equalizing condition study method, so detailed description for that will be omitted here. In this example, a description will be made only for major points of a cross-talk cancellation method that is an extension of the conventional LSE method.

$$y[t] = \sum_{n=-N/2}^{N/2} C_n[t] \times y_0[t-n] \qquad (3)$$

$$e[t] = y[t] - y_T[t] \qquad (4)$$

$$C_n[t+1] = C_n[t] - \mu \times e \times y[t+N/2-n] \qquad (5)$$

$$y[t] = \sum_{n=-N/2}^{N/2} C_n[t] \times y_0[t-n] - \sum_{n=-N/2}^{N/2} CP_n[t] \times yP_0[t-n] - \sum_{n=-N/2}^{N/2} CN_n[t] \times yN_0[t-n] \qquad (6)$$

$$e[t] = y[t] - y_T[t] \qquad (7)$$

$$C_n[t+1] = C_n[t] - \mu \times e \times y[t+N/2-n] \qquad (8)$$

$$CP_n[t+1] = CP_n[t] + \mu \times e \times yP_0[t+N/2-n] \qquad (9)$$

$$CN_n[t+1] = CN_n[t] + \mu \times e \times yN_0[t+N/2-n] \qquad (10)$$

Here, the t denotes a time, the $y_0[t]$, $yP_0[t]$, and $yN_0[t]$ denote a target track reproduced signal, a plus side track reproduced signal, and a minus side track reproduced signal respectively. The $y_T[t]$ denotes a target signal of a PRML decoder, y[t] denotes reproduced signal after cross-talk cancellation, e[t] denotes a difference from the target. The $C_n$, $CP_n$, and $CN_n$ denote the n-th tap coefficient of the signal equalizer of the target track, the plus side track, and the minus side track respectively. The N denotes the number of taps of the equalizer (the number is odd, here), and the μ denotes a constant. The expressions (3) to (5) are those of the ordinary LSE method while the expressions (6) to (10) are extended ones to the cross-talk cancellation of the present invention. The present invention is characterized in that the target signal is generated with use of a binarized result of a PRML decoder, as well as the difference between the reproduced signal of the target track and the target signal is used to update each tap coefficient sequentially to minimize the difference. And, in order to understand easily the description of the present invention, the number of tap coefficient of equalizers N and the μ value that is a feedback coefficient for studying are set equally in both target track and each side track. However, it is easy to change those values in the target track and each side track. The essential part of the present invention is as described above. And, this makes it easier to determine the value of each equalization coefficient so as to minimize the signal difference including cross-talk components, that is, the most effective S/N ratio.

In the following tap coefficients memory 63, coefficients updated and converged sequentially are retained up to the next study section and the coefficient in the tap coefficients memory 63 is reflected in the equalizers 57 and 58 for correcting each optical space distribution to a time response and the equalizer 60 for optimizing the frequency characteristic for effective binarizing in the PRML decoder 61. The signal in which the cross-talk is minimized in the above configuration is binarized to output object data. The information reproducing means of the present invention that focuses on the light intensity distribution in the tangential direction uses correcting means to cancel cross-talk components almost completely.

Second Embodiment

Figure 12:
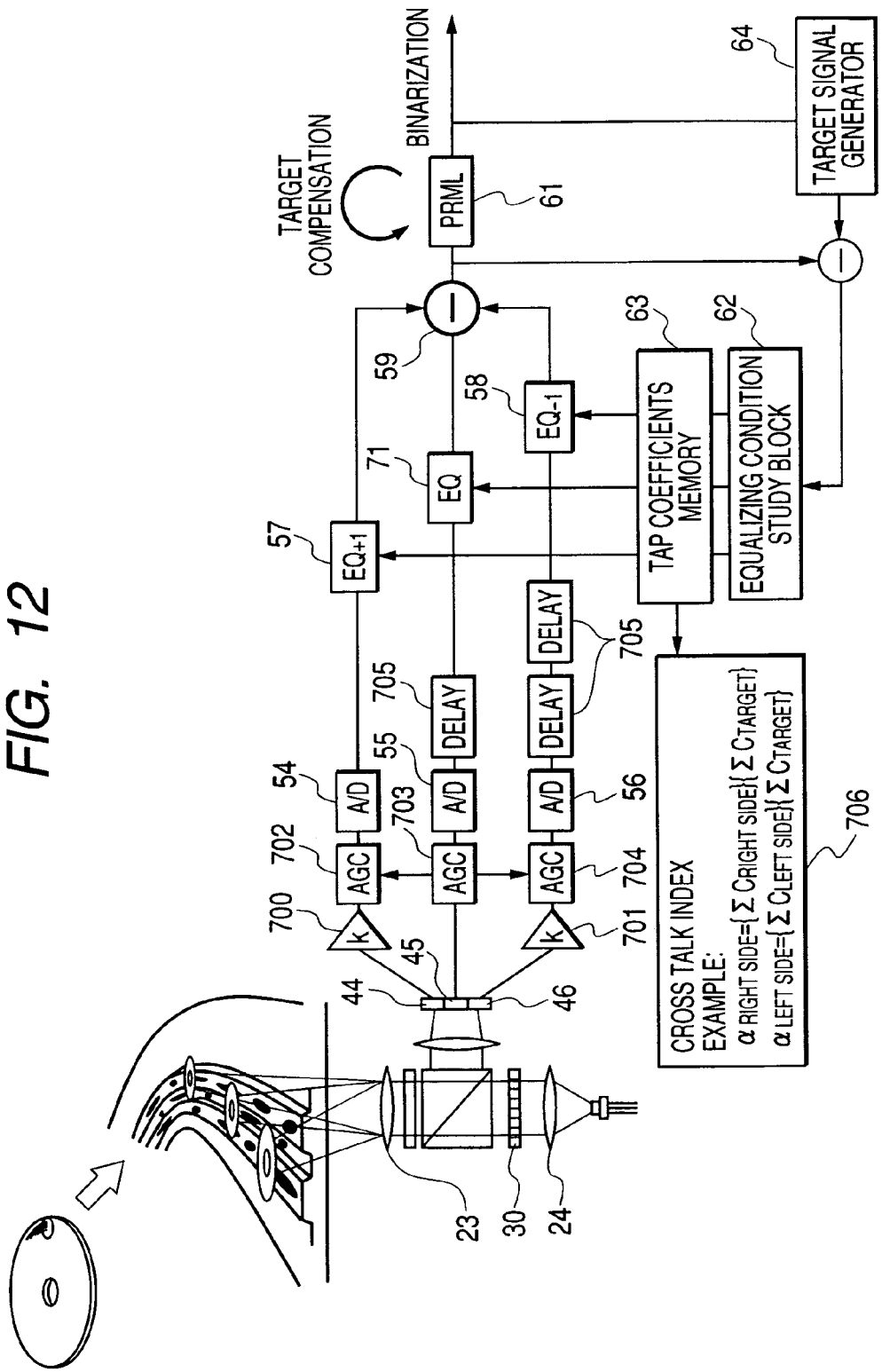
FIG. 12 is a block diagram of an information reproduction apparatus of the present invention.

FIG. 12 shows a block diagram of an information reproduction apparatus in the second embodiment of the present invention. The apparatus can cancel a cross-talk under high density conditions and obtain a cross-talk index simultaneously. The laser beam emitted from a laser beam source is passed through a collimating lens 24 to obtain a collimated beam. The collimated beam is then divided into three beam spots by a diffraction grating 30. The divided three beams are focused by an objective lens 23 on an information recording medium. Then, a polarizing beam splitter and a λ/4 plate are used to inject the reflected beams from the medium entirely into photo detectors 44 to 46 without returning them to the laser beam source. After that, according to the reproduced signals from the beam spots, which are outputs of the photo detectors 44 to 46, each of the light intensity correcting fixed value circuits 700 and 701 corrects the light intensity of each of the beam spots formed at both sides of the main spot that is determined as reference. This means that if the intensity of each of the beam spots divided by the diffraction grating is "Left side spot: main spot: right side spot=1:10:1", the circuits 700 and 701 are used to correct the intensity of each beam spot as follows.

Left side spot: main spot: right side spot=10:10:10=1:1:1

The signals from the three beam spots, which has beam intensity corrected by the light intensity correcting fixed value circuit 700 or 701, is then adjusted by the AGC (Automatic Gain Control) device 702 to 704 so that the reproduced signal from the target track comes to match with the dynamic range of the AD converter 55 and the AGC devices 702 to 704 are linked to each other so that the same gain also functions for the reproduced signals from both of the side tracks. After that, the reproduced signals from all those tracks are digitized in the AD converts 54 to 56.

The three beam spots are positioned in three tracks (front, center, and rear) respectively at an almost equal distance from each another so as to be prevented from mutual interference. And, because cross-talk components must be canceled by subtracting the cross-talk components of the side tracks from the reproduced signal from the target track with respect to the information recorded in the adjacent three tracks at the same time, the timings of the beam spots positioned in those three tracks (front, center, and rear) at a certain distance from each another must be adjusted so as to be aligned. This is why the delay circuit 705 is used for the timing adjustment.

Each reproduced signal of which timing is adjusted in the delay circuit 705 is passed through the equalizers as follows; the signals reproduced from both side tracks are passed through the equalizers 57 and 58 that correct an optical space distribution to a time response while the signal reproduced from the target track is passed through the (EQ) 71, which optimizes the frequency characteristic for proper binarizing in the PRML decoder 61 having effects for determining a target level in proportion to an amount of asymmetry so as to cope with a non-linear shift of a recording mark corresponding to bit pattern for a high linear density. After that, the signals reproduced from both side tracks corrected an optical distribution to a time response by the equalizers 57 and 58 are subtracted by the subtractor 59 from the signal reproduced from the target track optimized by the equalizer 71.

The signal obtained through the subtraction is passed to the PRML decoder 61 so as to be PRML-decoded and binarized in one path. As described above, the decoder 61 determines a target level in proportion to an amount of asymmetry to cope with a non-linear shift of each recording mark corresponding to bit pattern for a high linear density. The decoded signal is then passed to the target signal generator 64 to obtain the target signal. Then, a difference between this target signal and a signal obtained through the subtraction is used to make the equalizing condition study block 62 study the tap coefficients of equalizers for a certain period sequentially to minimize the difference.

The tap coefficients memory 63 retains coefficients to be updated, then converged sequentially up to the next study period so that the retained coefficients are reflected in the equalizer 71 that optimizes the frequency characteristic so as to binarize signals properly for the PRML decoder 61 in the equalizers 57 and 58 that correct an optical space distribution to a time response respectively, as well as the PRML decoder 61. In addition, the values of the coefficients retained in the tap coefficients memory 63 are used to obtain a cross-talk index 706. The $\Sigma C_{right\ side}$, $\Sigma C_{left\ side}$, and $\Sigma C_{target}$ in the cross-talk index 706 are used as follows. In Table 1, for example, the number of taps=5, cross-talk index is the sum of the values of the five tap coefficients.

The index enables to do the following.
(1) Due to limiting the cross-talk index value, to protect from abnormal actions to be caused by a disk defect, etc.
(2) The focus can be adjusted to minimize the $(\alpha_{right\ side}+\alpha_{left\ side})$ value.
(3) The radial tilting can be adjusted to minimize the $|\alpha_{right\ side}+\alpha_{left\ side}|$ value.
(4) The adjusted $(\alpha_{right\ side}+\alpha_{left\ side})$ value can be used to know how much the optical head is degraded. Consequently, the system is protected from recording data using the optical head after its life is exhausted.

The above configuration makes it possible to output cross-talk minimized binarized signals.

Figure 13:
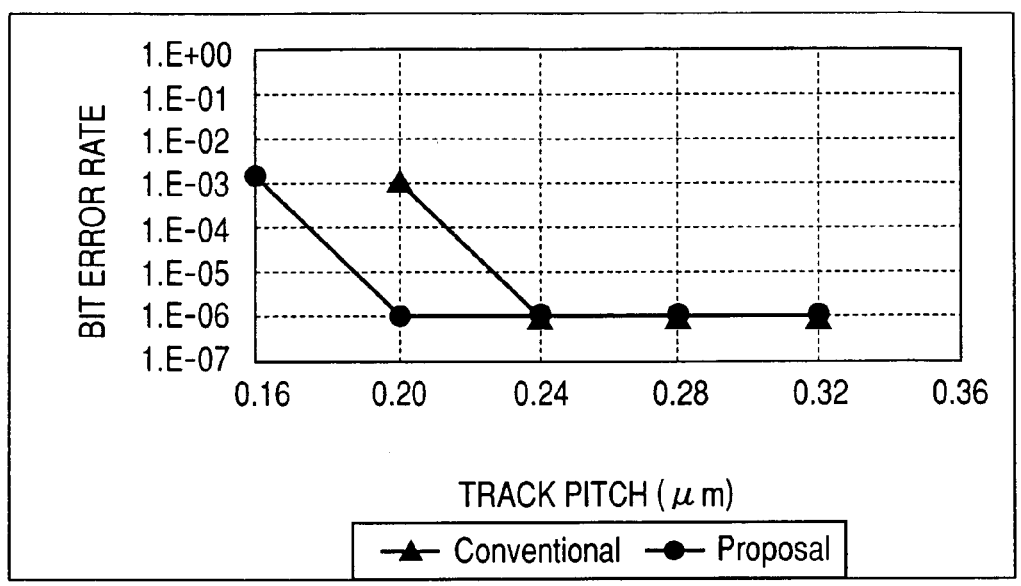
FIG. 13 is a simulation result of a cross-talk cancellation method of the present invention.

FIG. 13 shows a simulation result of the light intensity corresponding cross-talk cancellation method employed for the information reproduction apparatus of the present invention shown in FIG. 12. As a result of the simulation carried out in an ideal state, it is found that the method of the present invention causes no error even at a track pitch of 0.20 μm. Consequently, the present invention is found to be more practical than the conventional method.

Figure 14:
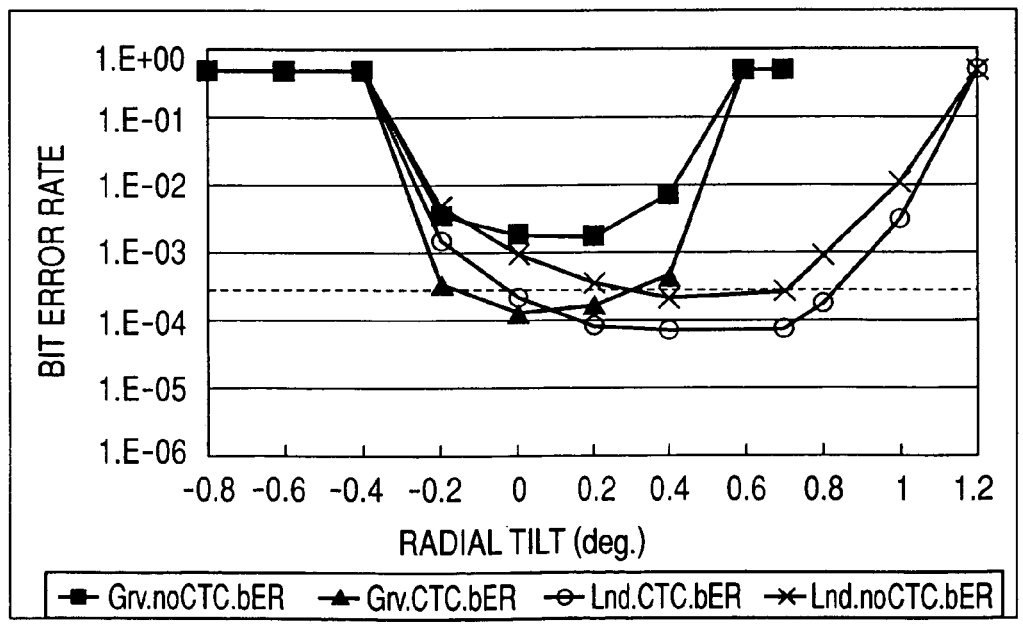
FIG. 14 is a test result of the cross-talk cancellation method of the present invention.

FIG. 14 shows a verification result of the effect of the light intensity corresponding cross-talk cancellation method employed for the information reproduction apparatus of the present invention shown in FIG. 12. The verification is done by testing the bit error rate dependency of an optical disk with respect to disk tilt, which is the most significant disturbance factor in practical use of the optical disk. The Grv.noCTC.bER in the figure denotes a result when no cross-talk is canceled in any groove. The Grv.CTC.bER in the same figure denotes a result when the cross-talk cancellation method of the present invention is used. This verification result may also apply to the Lnd (land). When compared with a case in which no cross-talk is canceled, the bit error rate in the groove is reduced by a figure and the bit error rate in the land is also reduced. Consequently, the bit error rate is reduced to $10^{-4}$ and under in both land and groove. As described above, it is found that the information reproduction method of the present invention can cancel cross-talk components surely even when beam spot aberration such as disk tilt occurs.

Third Embodiment

Figure 15:
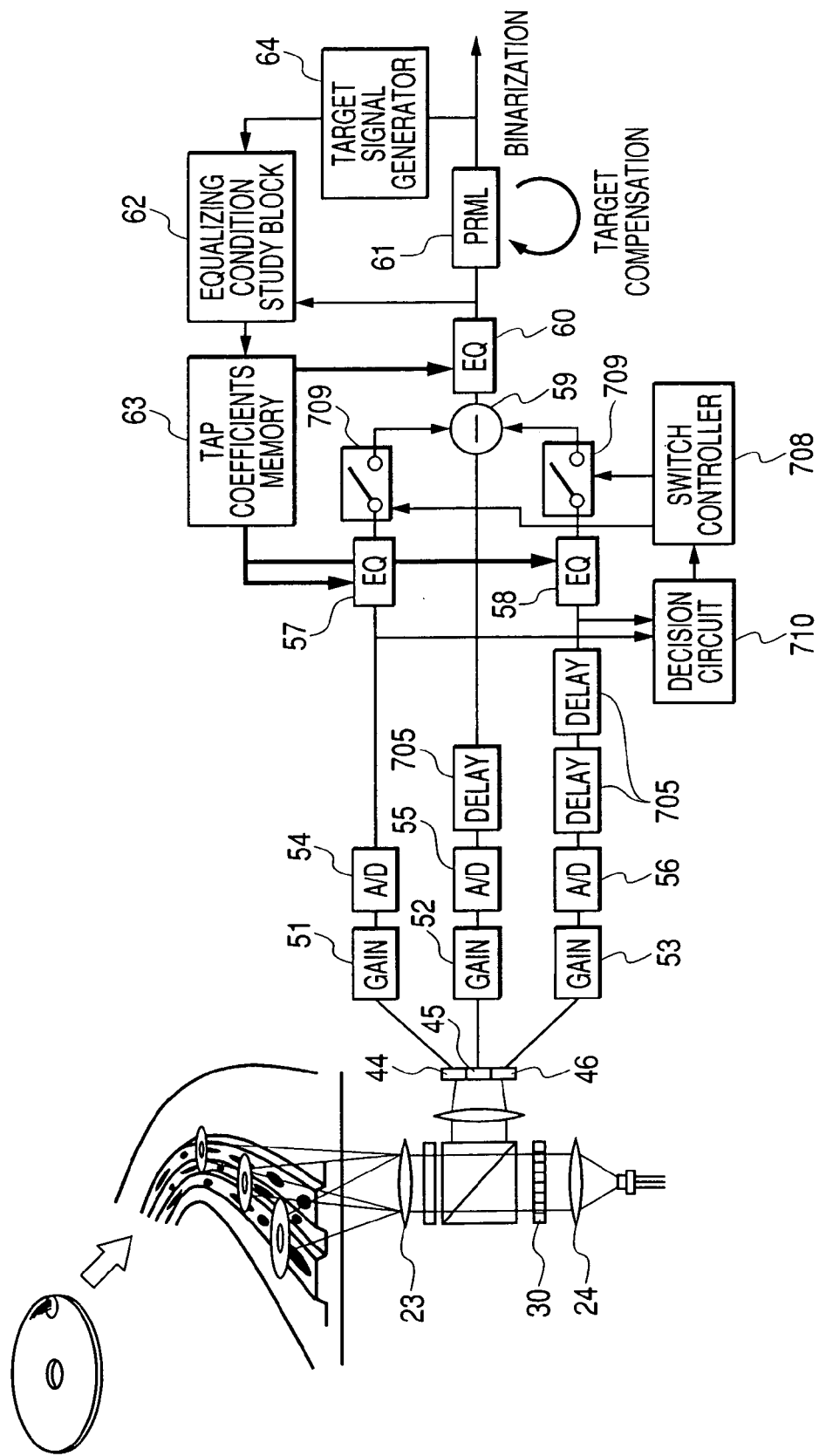
FIG. 15 is another block diagram of the information reproduction apparatus of the present invention.

FIG. 15 shows a block diagram of an information reproduction apparatus in the third embodiment of the present invention. In this third embodiment, a switch 709 is provided beyond each of the equalizers 57 and 58 in the first embodiment. In this third embodiment, a decision circuit 710 decides, for example, whether or not information is recorded in object side tracks and the switch 709 provided in a switch controller 708 is turned on/off according to the decision result. If no information is recorded in the side tracks, the switch 709 is turned off to stabilize the processing. The switch 709 is also turned off when in retrying reproduction/studying recording conditions to reduce the reproduction error rate and improve the compatibility of recorded information, thereby stabilizing the processing.

Fourth Embodiment

Figure 16:
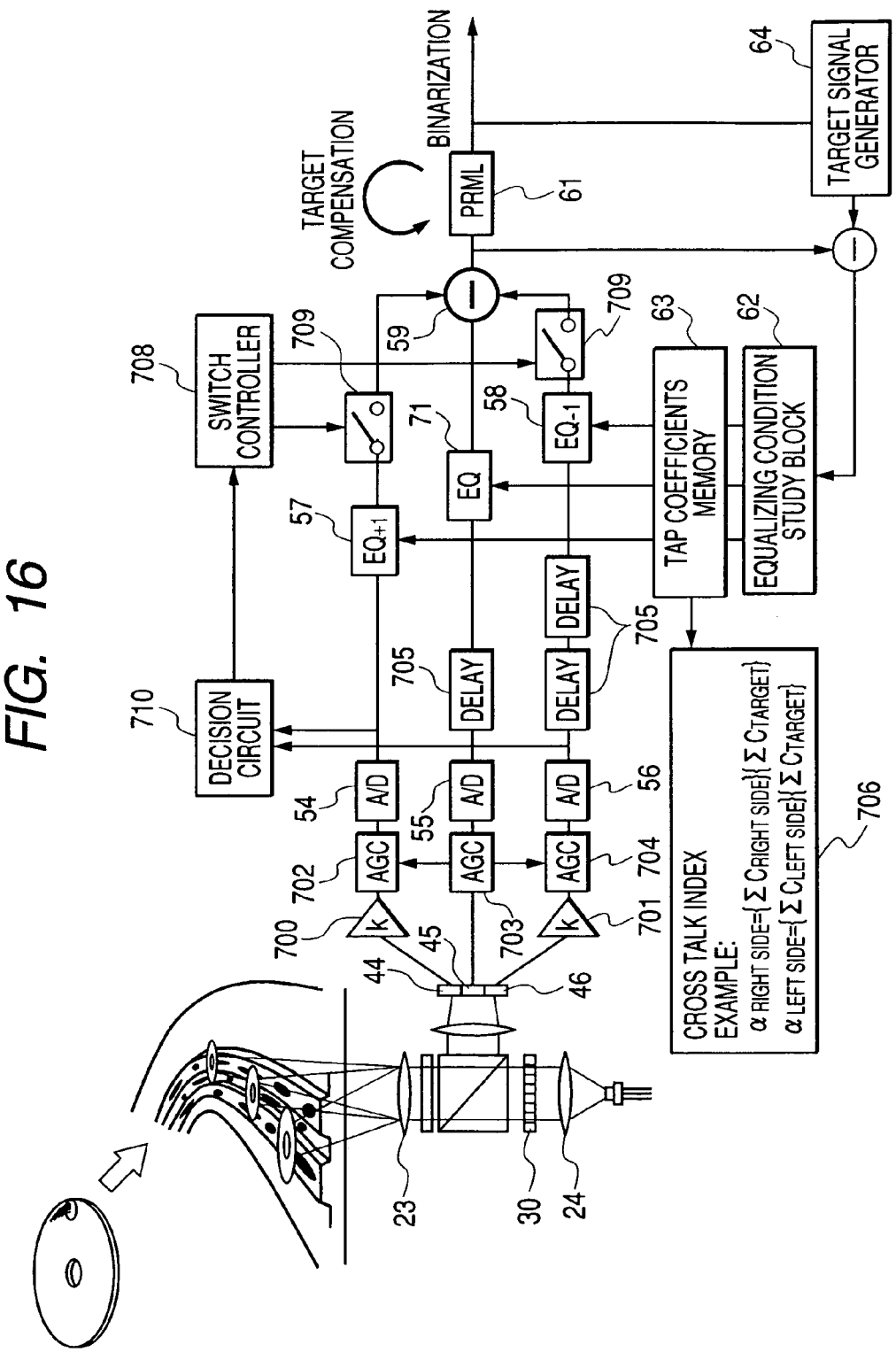
FIG. 16 is still another block diagram of the information reproduction apparatus of the present invention.

FIG. 16 shows a block diagram of an information reproduction apparatus in the fourth embodiment of the present invention. In this fourth embodiment, a switch 709 is provided beyond each of the equalizers 57 and 58 in the second embodiment. In this fourth embodiment, the decision circuit 710 decides, for example, whether or not information is recorded in object side tracks and the switch 709 provided in the switch controller 708 is turned on/off according to the decision result. If no information is recorded in the side tracks, the switch 709 can be turned off to stabilize the processing. The switch 709 is also turned off when in retrying reproduction/studying recording conditions to reduce the reproduction error rate and improve the compatibility of recorded information, thereby stabilizing the processing.

Fifth Embodiment

Figure 17:
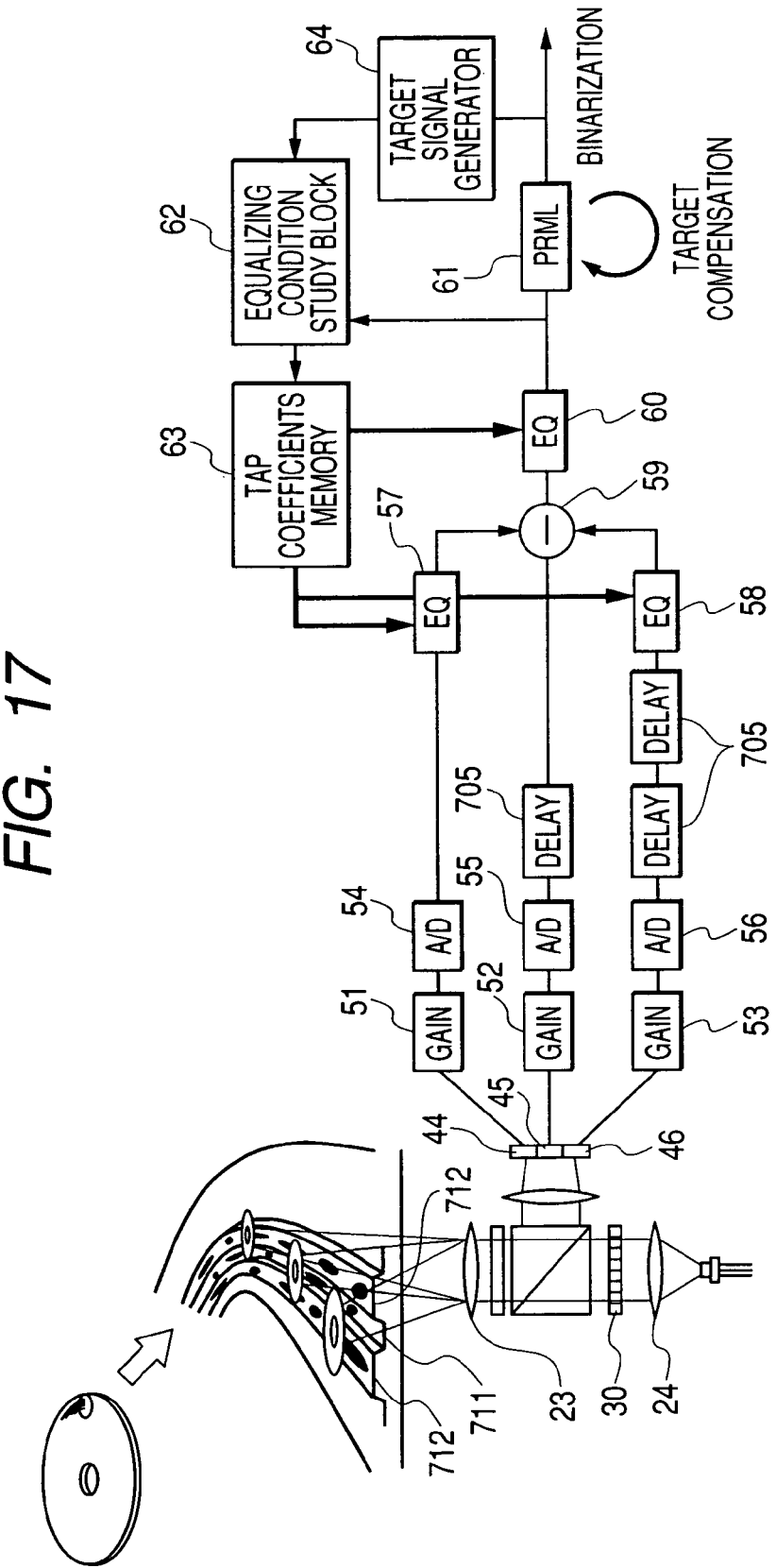
FIG. 17 is still another block diagram of the information reproduction apparatus of the present invention.

FIG. 17 shows a block diagram of an information reproduction apparatus in the fifth embodiment of the present invention on groove recording.

Three beam spots are positioned in three tracks (front, center, and rear) by a diffraction grating at a certain distance from each another to prevent mutual interference. The center spot becomes the main spot and the spots at both sides of the center one become side spots. The center spot is focused in the target track. When in the verification of the present invention, parameters are set as follows; the beam wavelength is 405 nm and the numerical aperture is 0.85, so that the beam spot diameter becomes 410 nm that is calculated from $(\lambda/NA) \times 0.87$.

Divided three beams are focused by an objective lens 23 on the object information recording medium. Then, a polarizing beam splitter and a $\lambda/4$ plate are used to inject all the reflected beams from the recording medium into photo detectors 44 to 46 without returning them to the laser beam source. After that, gain adjusting means 51 to 53 adjust the gains of the reproduced signals from the beam spots in the tracks so as to match them with the dynamic ranges of the AD converters 54 to 56. The reproduced signals from the beam spots are output from the photo detectors 44 to 46. After that, the AD converters 54 to 56 convert the reproduced signals from the tracks to digital values. The three beam spots are positioned by a diffraction grating in adjacent three tracks (front, center, and rear) at equal intervals and at a certain distance from each another. Because a cross-talk is canceled by subtracting cross-talk components in both side tracks from the reproduced signal from the target track at the same timing, the timings of the beam spots positioned in those three tracks must be adjusted to be aligned at the same timing. This is why the delay circuit 705 is used to adjust the timings.

The reproduced signals from both of the side tracks among the timing-adjusted reproduced signals are passed to the equalizers (EQ) 57 and 58 for correcting a light space distribution to a time response respectively as described above. In the equalizers 57 and 58 in this embodiment, because a reproduction beam traces each of the target track (groove 711) and the side tracks (groove 712) respectively, it is just required here to correct the light intensity distribution denoted by a solid line 604 in FIG. 6 to the light intensity distribution (different from the distribution denoted by the dotted line 602) in the tangential direction of the main spot moving to a side track. And, in order to obtain the configuration of each of the equalizers 57, 58, and 60, a method for calculating tap coefficients of the equalizers, and the continuous cross-talk cancellation effect, the tap coefficients of equalizers are studied properly as needed with use of the LSE method or the like to keep optimizing the tap coefficients. This process is the same as that in the first embodiment.

The information reproducing means of the present invention, configured as described above, can output cross-talk minimized binary signals. And, the information reproducing means can apply to various recording methods such as land/groove recording, grove recording, etc.

Sixth Embodiment

Figure 18:
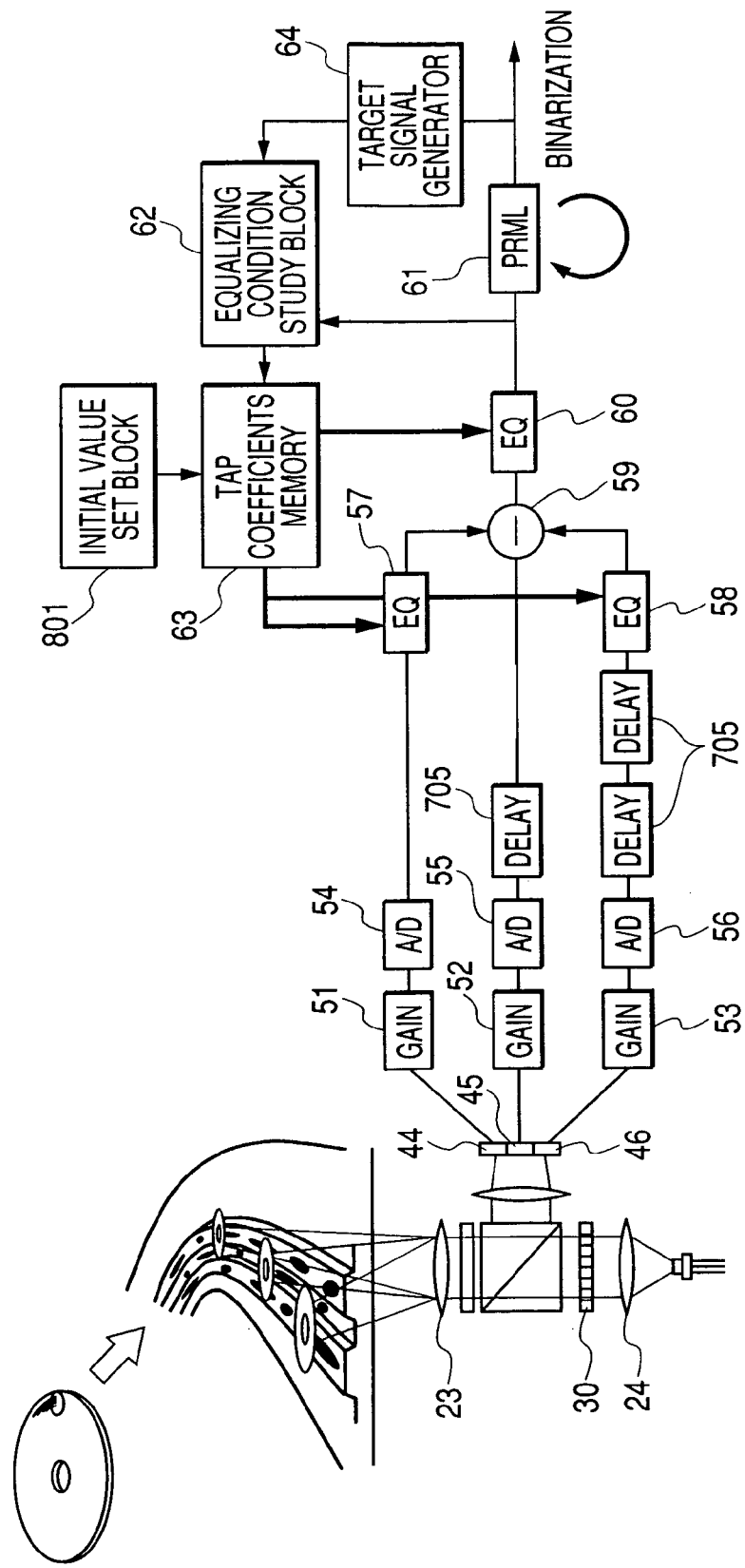
FIG. 18 is still another block diagram of the information reproduction apparatus of the present invention.

The information reproduction apparatus in this sixth embodiment is provided with initial value setting means 801. This is only a difference from the apparatus in the first embodiment. FIG. 18 shows a block diagram of the apparatus in the sixth embodiment. The initial values determined optimally by this initial value setting means 801 are retained beforehand in a tap coefficients memory 63. Consequently, the studying time is reduced and the reproduction processing is speeded up.

A function for reading the initial values from the object optical medium may be added to the initial value setting means 801. If the function is added to the initial value setting means 801, information comes to be reproduced from a plurality of optical disks stably.

Seventh Embodiment

Figure 19:
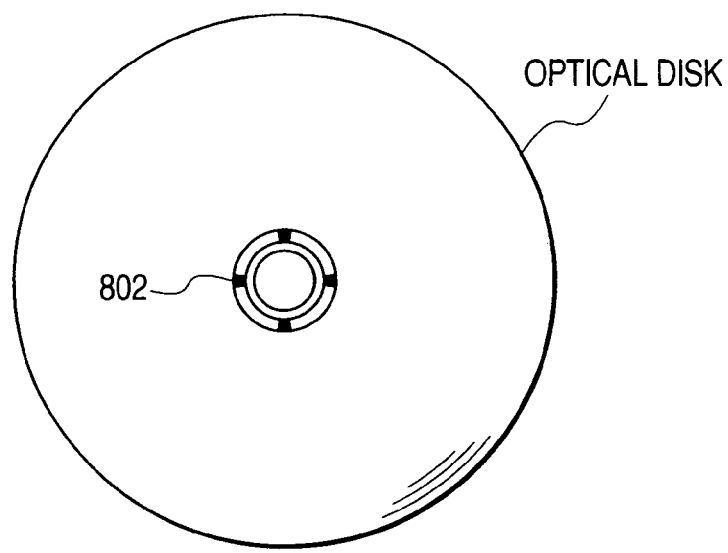
FIG. 19 is an example of a study region provided on an information recording medium.

The step of studying tap coefficients of equalizers may be executed in a studying region 802 provided on the information recording medium in the information write/read apparatus in this seventh embodiment as shown in FIG. 19. The studying region on the medium may be changed appropriately case by case. For example, the region may be provided in an inner periphery portion or in each sector on the medium. Information recorded to study may be information to be recorded cyclically; the recording cycle may be determined freely.

Eighths Embodiment

Figure 20:
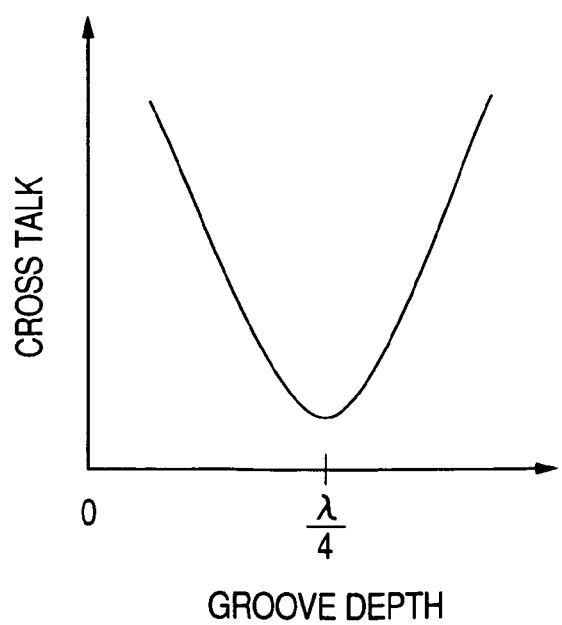
FIG. 20 is a relationship between a groove depth and a cross-talk amount.

In the information write/read apparatus in the second embodiment, the light intensity correcting fixed value circuit 700/701 corrects the light intensity of the laser beam spots at both sides with reference to the main spot according to the signals reproduced from the beam spots output from the photo detectors 44 to 46. In addition to the light intensity, the groove depth must also be corrected in the apparatus. FIG. 20 shows a relationship between a groove depth and a cross-talk amount. As shown in FIG. 20, if the wavelength of a reproduction beam is $\lambda$, it is found that the cross-talk amount changes axial-symmetrically by assuming $\lambda/4$ as the minimum cross-talk (center axis). A circuit for correcting this groove depth may be provided in the apparatus. The apparatus will come to cancel cross-talk components more accurately with use of such a circuit.

Ninth Embodiment

Figure 21:
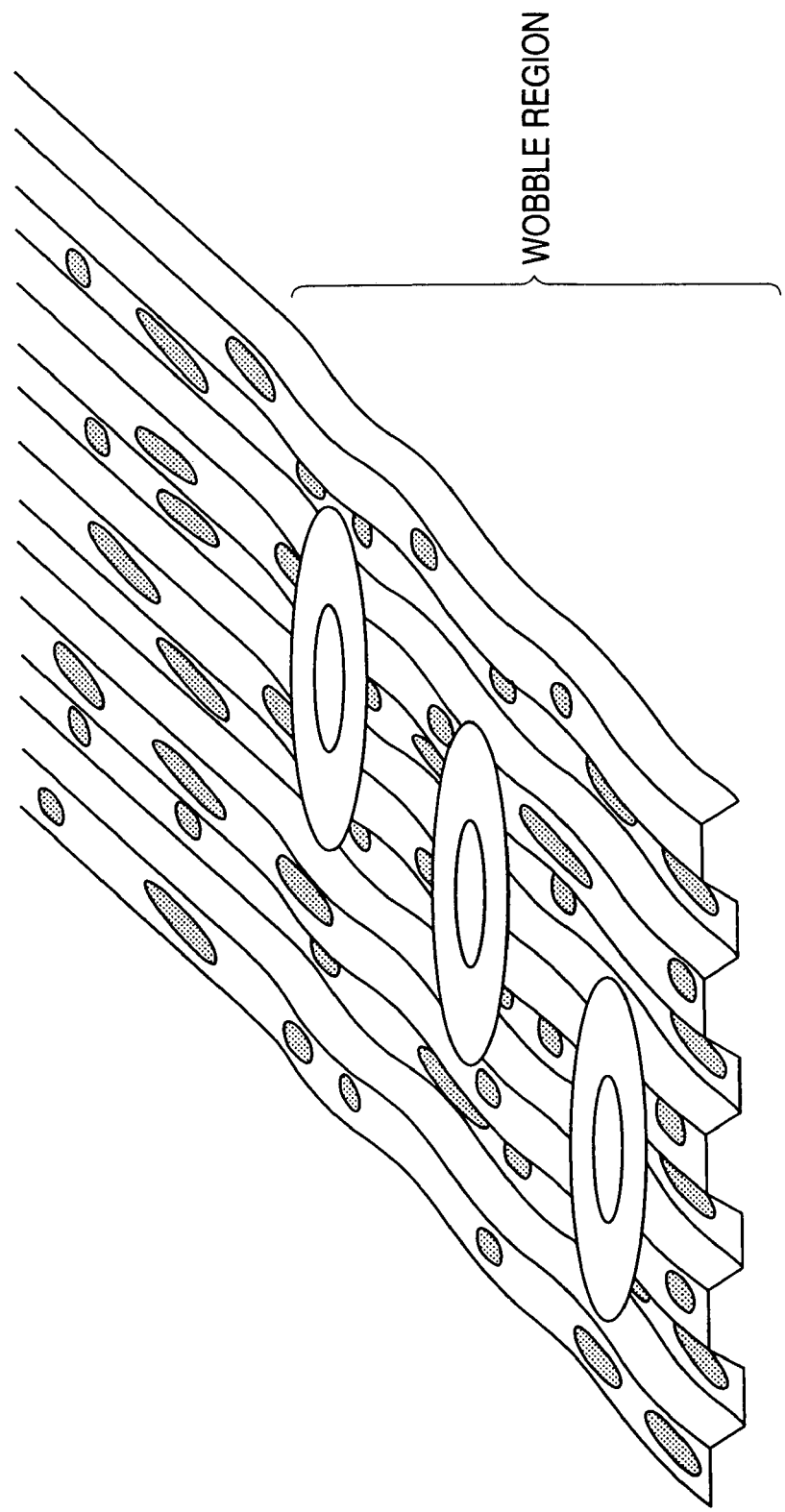
FIG. 21 is a concept chart of the cross-talk cancellation method of the present invention applied to a wobble address.

While a sum signal is used to detect an address signal just like data in the information write/read apparatus in the first embodiment, address information is retained in wobbling tracks when the wobble address encoding method as shown in FIG. 21 is used. In that connection, the wobble information is detected by differential signals.

The 3-beam cross-talk cancellation in the first embodiment may also apply to wobble signals to reduce cross-talk components of address information, thereby address detection reliability is improved more significantly. If such 3-beam cross-talk cancellation applies to both sum and differential signals, address information and data information are reproduced with higher reliability. In that connection, the optimal equalizer condition, as well as the encoding method come to differ between the sum signal and the differential signal, so that the apparatus should preferably be provided with two independent 3-beam cross-talk cancellation circuits.

Tenth Embodiment

FIG. 22 shows how beam spots come to be disposed in the information reproduction apparatus of the present invention. A diffraction grating changes disposition of those beam spots as shown in FIG. 22A through FIG. 22C. Consequently, large cross-talk components on which beam spots are disposed are reduced.

Figure 22A:
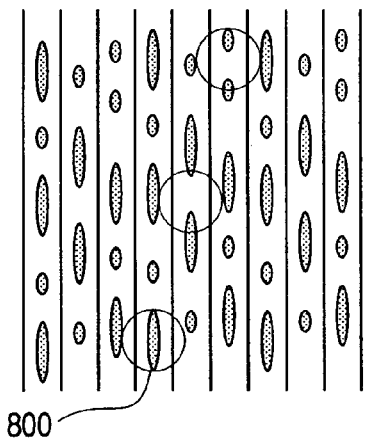
FIG. 22 illustrates how laser beam spots are disposed in the information reproduction apparatus of the present invention.
Figure 22B:
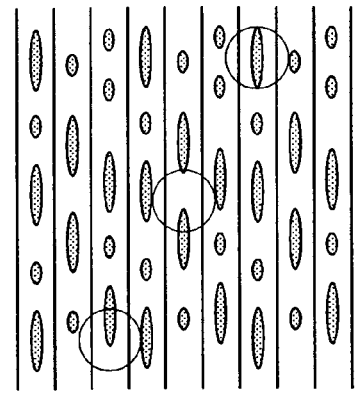
Figure 22C:
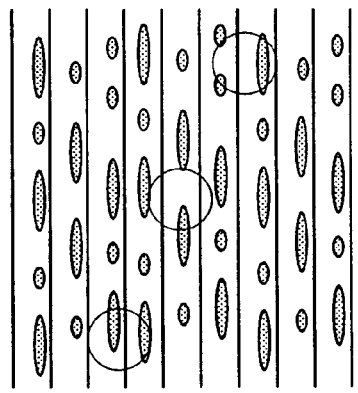
Figure 22D:
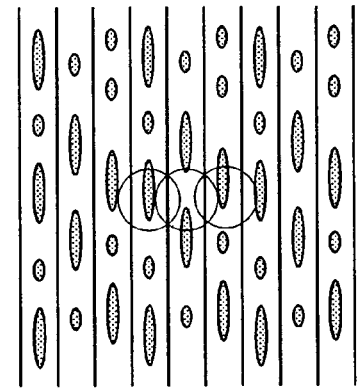

The cross-talk cancellation effect described above can be achieved even for three beam spots disposed in a horizontal line as shown in FIG. 22D if the wavelength of the beam source is changed, for example.

Figure 22E:
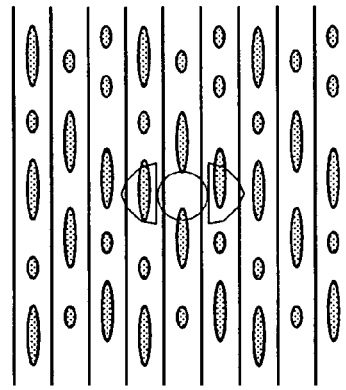
Figure 22F:
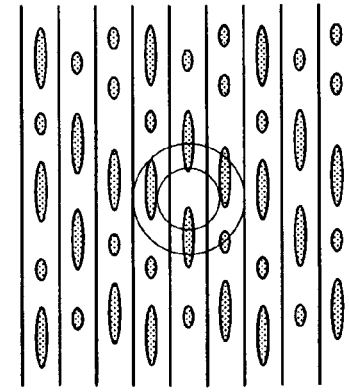

And, a similar cross-talk cancellation effect can be obtained even for beam spots that are different in shape from each another as shown in FIG. 22F. For example, when the second beam spot is wider than the first beam spot, the difference between the light intensity distribution of the second beam spot and that of the first beam spot is assumed as a cross-talk component (side track information), which is then subtracted from the object and the result (influence) is removed from the light intensity distribution of the first beam spot to cancel the cross-talk component. In that case, the polarization of the second beam spot is orthogonal to that of the first beam spot.

The similar cross-talk cancellation effect is obtained even when the second beam spot has two peaks in shape as shown in FIG. 22E.

As described above, if the second beam spot is disposed right beside or overlapped with the first beam spot, that is, both of the beam spots are on a line vertical to the subject track, the timing adjustment can be omitted, thereby the circuit configuration is simplified. This is an advantage of this embodiment. It is also possible to use the three beam spots in the first embodiment for DPP tracking. At that time, due to changing a plurality of tracking method for each groove shape, the tracking servo for various types of optical disks to reproduce recorded information is possible.

In this embodiment, three beam spots are used. However, only two beam spots may be used to reproduce information. In that connection, while the cross-talk cancellation effect becomes lower than that of the three beam spots, the spot forming means becomes easier and the circuit configuration is simplified.

What is claimed is:

1. An information reproduction apparatus, comprising:
   means for forming a first beam spot and a second beam spot in an information recording medium;
   a first detector for detecting a reflected beam from said first beam spot;
   a second detector for detecting a reflected beam from said second beam spot;
   a first equalizer for adjusting at least a frequency characteristic of an output signal from said first detector;
   a second equalizer for adjusting at least a frequency characteristic of an output signal from said second detector;
   an arithmetic circuit for computing an output from both of said first and second equalizers respectively;
   a decoding block for decoding information recorded on said information recording medium according to said output from said arithmetic circuit;
   a target signal generator for generating a target signal from said output from said decoding block;
   a compensation value generator by comparing an output level of said target signal generator with an output value of said arithmetic circuit to compute a compensation value of a tap coefficient of said first equalizer and/or second equalizer; and
   input means for inputting said compensation value to said first equalizer and/or second equalizer.

2. An information reproduction apparatus, comprising:
   means for forming a first beam spot and a second beam spot in an information recording medium;
   a first detector for detecting a reflected beam from said first beam spot;
   a second detector for detecting a reflected beam from said second beam spot;
   a first equalizer for adjusting at least a frequency characteristic of an output signal from said second detector;
   an arithmetic circuit for computing an output from both of said first detector and said first equalizer respectively;
   a second equalizer for adjusting at least a frequency characteristic of an output signal from said computing circuit;
   a decoding block for decoding information recorded on said information recording medium according to said output from said second equalizer;
   a target signal generator for generating a target signal from an output of said decoding block;
   a compensation value generator for comparing an output level of said target signal generator with an output value of said arithmetic circuit to compute a compensation value of a tap coefficient of said first equalizer and/or second equalizer; and
   input means for inputting said compensation value to said first equalizer and/or second equalizer.

3. The information reproduction apparatus according to claim 1;
   wherein said apparatus further includes:
   means for forming a third beam spot on said information recording medium;
   a third detector for detecting a reflected beam from said third beam spot; and
   a third equalizer for adjusting at least a frequency characteristic of an output signal from said third detector;
   wherein said arithmetic circuit computes outputs from both of said first equalizer and said second and third equalizers while said compensation value generator compares an output level of said target signal generator with an output of said arithmetic circuit to compute compensation values of tap coefficients of said first equalizer and/or second and third equalizers and said input means input said compensation values to said first equalizer and/or second and third equalizers.

4. The information reproduction apparatus according to claim 2;
   wherein said apparatus further includes:
   means for forming a third beam spot on said information recording medium;
   a third detector for detecting a reflected beam from said third beam spot; and
   a third equalizer for adjusting at least a frequency characteristic of an output signal of said third detector;
   wherein said arithmetic circuit computes an output of said first detector and outputs of said second and third equalizers while said compensation value generator compares an output level of said target signal generator with an output of said computing circuit to compute compensation values of tap coefficients of said first equalizer and/or second and third equalizers and said input means input said compensation values to said first equalizer and/or second and third equalizers.

5. The information reproduction apparatus according to claim 1;
   wherein each of said equalizers is a transversal type filter or FIR type filter having a plurality of coefficients and a plurality of taps.

6. The information reproduction apparatus according to claim 2;
   wherein each of said equalizers is a transversal type filter or FIR type filter having a plurality of coefficients and a plurality of taps.

7. The information reproduction apparatus according to claim 1;
   wherein the minimum square error method is used as a compensation value generation method of said compensation value generator.

8. The information reproduction apparatus according to claim 2;
wherein the minimum square error method is used as a compensation value generation method of said compensation value generator.

9. The information reproduction apparatus according to claim 1;
wherein said decoding block includes a PRML decoding block.

10. The information reproduction apparatus according to claim 2;
wherein said decoding block includes a PRML decoding block.

11. The information reproduction apparatus according to claim 1;
wherein said apparatus further includes initial value setting means for setting an initial value of a tap coefficient in each of said equalizers.

12. The information reproduction apparatus according to claim 2;
wherein said apparatus further includes initial value setting means for setting an initial value of a tap coefficient in each of said equalizers.

13. The information reproduction apparatus according to claim 1;
wherein said apparatus further includes a timing adjusting block for adjusting timings among outputs from said plurality of detectors.

14. The information reproduction apparatus according to claim 2;
wherein said apparatus further includes a timing adjusting block for adjusting timings among outputs from said plurality of detectors.

15. The information reproduction apparatus according to claim 1;
wherein said apparatus further includes a switch for turning on/off an output from said second equalizer.

16. The information reproduction apparatus according to claim 2;
wherein said apparatus further includes a switch for turning on/off an output from said first equalizer.

17. An information reproduction method, comprising:
a step of forming a main beam spot and one or more sub beam spots on an information recording medium;
a step of detecting a reflected beam from said main beam spot in a first detector and a reflected beam from a sub beam spot in a second detector;
a step of adjusting at least a frequency characteristic of an output signal from said second detector in a first equalizer;
a step of computing an output from both of said first detector and said first equalizer respectively in a computing circuit;
a step of adjusting at least a frequency characteristic of an output signal from said computing circuit in a second equalizer;
a step of decoding information recorded on said information recording medium according to an output from said second equalizer in a decoding block;
a step of generating a target signal from an output of said decoding block in a target signal generator;
a step of comparing an output level of said target signal generator with an output value of said computing circuit to compute a compensation value of a tap coefficient of said first equalizer and/or second equalizer in a compensation value generator; and
a step of inputting said compensation value to said first equalizer and/or second equalizer.

18. The information reproduction method according to claim 17 further comprising:
a step of recognizing when the information reproduction apparatus is in a reproduction retry or writing condition study; and
a step of effectively turning off the output signal from said second detector when the information reproduction apparatus is in a reproduction retry or writing conditions study.

19. The information reproduction method according to claim 17;
wherein said method further includes;
a step of studying the tap coefficients of said first and second equalizers; and
a step of setting said studied tap coefficients of said equalizers in said first and second equalizers to reproduce information.

20. The information reproduction method according to claim 19;
wherein said step of studying the tap coefficients is executed in a studying region provided on said information recording medium.

* * * * *